(12) United States Patent
Maekawa et al.

(10) Patent No.: US 9,821,375 B2
(45) Date of Patent: Nov. 21, 2017

(54) METHOD FOR PRODUCING METAL MICROPARTICLES

(71) Applicant: M. TECHNIQUE CO., LTD., Izumi-shi, Osaka (JP)

(72) Inventors: Masaki Maekawa, Izumi (JP); Masakazu Enomura, Izumi (JP)

(73) Assignee: M. TECHNIQUE CO., LTD., Izumi-shi, Osaka (JP)

( * ) Notice: Subject to any disclaimer, the term of this patent is extended or adjusted under 35 U.S.C. 154(b) by 201 days.

(21) Appl. No.: 14/427,596

(22) PCT Filed: Oct. 2, 2012

(86) PCT No.: PCT/JP2012/075463
§ 371 (c)(1),
(2) Date: Mar. 11, 2015

(87) PCT Pub. No.: WO2014/041705
PCT Pub. Date: Mar. 20, 2014

(65) Prior Publication Data
US 2015/0246395 A1 Sep. 3, 2015

(30) Foreign Application Priority Data

Sep. 12, 2012 (JP) .................................. 2012-201023

(51) Int. Cl.
*B22F 9/24* (2006.01)
(52) U.S. Cl.
CPC ............ *B22F 9/24* (2013.01); *B22F 2999/00* (2013.01)

(58) Field of Classification Search
None
See application file for complete search history.

(56) References Cited

U.S. PATENT DOCUMENTS

| 4,539,041 A | 9/1985 | Figlarz et al. |
| 2004/0200318 A1 | 10/2004 | Kim et al. |

(Continued)

FOREIGN PATENT DOCUMENTS

| CN | 1539581 A | 10/2004 |
| CN | 101028653 A | 9/2007 |

(Continued)

*Primary Examiner* — George Wyszomierski
(74) *Attorney, Agent, or Firm* — Birch, Stewart, Kolasch & Birch, LLP

(57) ABSTRACT

The present invention addresses the problem of providing a method for producing metal microparticles in which the particle diameter and the coefficient of variation are controlled. Using at least two kinds of fluid to be processed including a fluid which contains at least one kind of reducing agent, the fluid to be processed is mixed in a thin film fluid formed between at least two processing surfaces, at least one of which rotates relative to the other, and which are disposed facing each other and capable of approaching and separating from each other, and metalmicroparticles are separated. At this time, the fluid to be processed containing one or both of the fluid which contains at least one kind of metal and/or metal compound and the fluid which contains at least one kind of reducing agent contains a water-containing polyol in which water and a polyol are mixed, and does not contain a monovalent alcohol, and the particle diameter and coefficient of variance of the separated metal microparticles is controlled by controlling the ratio of water contained in the water-containing polyol.

18 Claims, 13 Drawing Sheets

(56) References Cited

U.S. PATENT DOCUMENTS

| | | | |
|---|---|---|---|
| 2006/0094597 A1* | 5/2006 | Goia | B01D 53/944 502/326 |
| 2009/0025510 A1 | 1/2009 | Lee et al. | |
| 2010/0155310 A1* | 6/2010 | Enomura | B01F 3/0807 209/668 |
| 2010/0243947 A1* | 9/2010 | Enomura | B01D 9/0054 252/62.55 |
| 2010/0327236 A1 | 12/2010 | Enomura | |
| 2011/0048170 A1* | 3/2011 | Bhatia | B22F 1/0025 75/330 |
| 2013/0333520 A1 | 12/2013 | Enomura | |

FOREIGN PATENT DOCUMENTS

| | | |
|---|---|---|
| EP | 1839784 A1 | 10/2007 |
| EP | 2177294 A1 | 4/2010 |
| JP | 59-173206 A | 10/1984 |
| JP | 11-302709 A | 11/1999 |
| JP | 2003-27115 A | 1/2003 |
| JP | 2009-24254 A | 2/2009 |
| WO | WO 2006/050251 A2 | 5/2006 |
| WO | WO 2006/062186 A1 | 6/2006 |
| WO | WO 2009/008390 A1 | 1/2009 |
| WO | WO 2012/014530 A1 | 2/2012 |
| WO | WO 2012/124046 A1 | 9/2012 |

\* cited by examiner

METHOD FOR PRODUCING METAL MICROPARTICLES

The present invention relates to a method for producing metal microparticles.

In recent years, metal microparticles are wanted in a wide range of the fields including a catalyst, an electrically conductive material, a magnetic material, a secondary electron discharging material, a luminescent material, a heat-absorbing material, an energy storage material, an electrode material, and a color material; and in these fields, various metal microparticles having different diameters depending on the use purposes thereof are required. The methods for producing these metal microparticles are classified roughly into a gas-phase method and a liquid-phase method. In the gas-phase method, a method like the one in which a solution containing a metal ion is sprayed into a high temperature environment thereby decomposing thereof is known to be general; however, in this method, there are problems including not only the difficulty to obtain the particles which have uniform particle diameter and crystallite diameter but also the tendency to a large equipment as well as a high energy cost; and therefore, nowadays, the liquid-phase method becomes a mainstream method.

As shown in Patent Document 1, in the case of the liquid-phase method in which substantially only water is used as a solvent, there have been problems including difficulty in controlling the particle diameter whereby leading to a complex recipe and so forth. Therefore, the polyol reduction method in which a polyvalent alcohol (polyol) is used as the solvent, as described in Patent Document 2 or 3, is receiving an attention from the view point to improve dispersibility as well as uniformity of the particle diameters. In the polyol reduction method, however, there have been problems including necessity of a long reaction time at high temperature in the reducing reaction and practical difficulty in controlling the particle diameter because it is difficult to carry out the reducing reaction uniformly. Alternatively, as mentioned in Patent Documents 4 and 5, there is a method in which more uniform particles are produced by including a different reducing agent in a polyol. However, in all of the methods mentioned above, because a certain reaction time is necessary to carry out the reducing reaction uniformly, there is no other way but selecting the reducing method which uses a batch method using a tank and so forth for the reaction; and therefore, it has been difficult to secure the uniformities in temperature, concentration, and the like during the reaction. Accordingly, the method with which metal microparticles having uniform particle diameter can be produced continuously has been wanted. Moreover, in the case when the polyol is used as the solvent, solubility of a metal compound which becomes a raw material of the metal microparticle in the polyol is so low that there have been problems that a long time is necessary to prepare the polyol solution in which the metal compound is dissolved, and that because as the time elapses the metal compound is separated out from the polyol solution of the metal compound once this solution has been prepared; and for other reasons as well, it has been difficult to produce the metal microparticle stably. In addition to these, in Patent Document 5, the method in which a mixed solvent of a polyol with a monovalent alcohol having 4 or less carbon atoms is used was proposed; however, because a solvent containing the monovalent alcohol with a low flash point was reacted under the state of being heated for a certain period of time, not only control of the reaction was difficult but also there has been a problem from the view point of safety. Therefore, for the reasons as mentioned above, the method with which uniform and homogeneous metal microparticles can be produced continuously and stably has been eagerly wanted.

By the applicant of the present application, as shown in Patent Document 6, the method with which uniform and homogeneous metal microparticles can be produced continuously and stably has been proposed; however, there is no specific disclosure with regard to the way how to control the particle diameter of the metal microparticles to be obtained and the coefficient of variation thereof. Especially, in the paragraph [0153] of the specification of Patent Document 6, there are such descriptions as "the above-mentioned solvent is not particularly restricted so far as it can dissolve the above-mentioned metal compound; and for example, water, an organic solvent, and the like may be mentioned", and "in view of solubility of the above-mentioned metal compound, water, an alcohol, and a mixed solution of water and an alcohol are preferable"; however, there is no description with regard to the way how to control the particle diameter of the metal microparticles to be obtained and the coefficient of variation thereof by controlling the ratio of water in the mixed solution of water and the alcohol, when the mixed solution of water and an alcohol is used as the solvent.

In addition, in Patent Document 5, the method in which a mixed solution of water with a mixed solvent of a polyol and a monovalent alcohol having 4 or less carbon atoms is proposed; however, although the particle diameter of the separated metal powders is controlled by controlling the mixing ratio of the mixed solvent to water, there is no description with regard to the control of the coefficient of variation of the particle diameter of the separated metal powders in the range of less than 5%.

PRIOR ART DOCUMENTS

Patent Document

Patent Document 1: Japanese patent Laid-Open Publication No. H11-302709
Patent Document 2: Japanese patent Laid-Open Publication No. S59-173206
Patent Document 3: International Patent Laid-Open Publication No. WO 2006/062186
Patent Document 4: Japanese patent Laid-Open Publication No. 2009-24254
Patent Document 5: Japanese patent Laid-Open Publication No. 2003-27115
Patent Document 6: International Patent Laid-Open Publication No. WO 2009/008390

In view of the situation as mentioned above, an object of the present invention is to provide a method for producing metal microparticles more uniformly, homogeneously, continuously, and stably than ever wherein by controlling the particle diameter of the metal microparticles to be obtained and the coefficient of variation thereof, metal microparticles whose particle diameters and coefficient of variation thereof are controlled may be produced. More hopefully, the present invention intends to provide a method for producing metal microparticles with controlled particle diameters of metal microparticles to be obtained and coefficient of variation thereof and with improved productivity.

PROBLEMS TO BE SOLVED BY THE INVENTION

In order to solve the problems as mentioned above, the present invention provides a method for producing metal microparticle wherein the method uses at least two fluids to be processed, of them, at least one fluid to be processed is a fluid which contains at least one metal and/or metal compound, and at least one fluid to be processed other than the afore-mentioned fluid to be processed is a fluid which contains at least one reducing agent, wherein these fluids to be processed are mixed in a thin film fluid formed between at least two processing surfaces which are disposed in a position they are faced with each other so as to be able to approach to and separate from each other, at least one of which rotates relative to the other, whereby separating the metal microparticle, wherein of the fluid which contains at least one metal and/or metal compound and the fluid which contains at least one reducing agent, at least anyone fluid to be processed contains a water-containing polyol in which water and a polyol are mixed while not containing a monovalent alcohol, wherein by controlling ratio of water which is contained in the water-containing polyol, particle diameter of the metal microparticle to be separated and coefficient of variation thereof are controlled.

In addition, the present invention may be executed as an embodiment wherein by controlling the ratio of water which is contained in the water-containing polyol so as to be in the range of 5 to 60% by weight, the coefficient of variation is controlled in the range of less than 5%.

In addition, the present invention may be executed as an embodiment wherein the polyol is any one kind selected from the group consisting of ethylene glycol, propylene glycol, trimethylene glycol, tetraethylene glycol, polyethylene glycol, diethylene glycol, glycerin, and polypropylene glycol.

In addition, the present invention may be executed as an embodiment wherein of the fluid which contains at least one metal and/or metal compound and the fluid which contains at least one reducing agent, any one fluid to be processed contains the water-containing polyol while not containing the monovalent alcohol, and as an embodiment wherein the fluid which contains at least one metal and/or metal compound contains the water-containing polyol while not containing the monovalent alcohol.

In addition, the present invention may be executed as an embodiment wherein both the fluids to be processed, the fluid which contains at least one metal and/or metal compound and the fluid which contains at least one reducing agent, contain the water-containing polyol but do not contain the monovalent alcohol.

In addition, the present invention may be executed as an embodiment wherein of the fluid which contains at least one metal and/or metal compound and the fluid which contains at least one reducing agent, any one fluid to be processed passes through between the two processing surfaces while forming the thin film fluid, a separate introduction path independent of a flow path through which the any one fluid to be processed passes is arranged, at least one opening leading to the separate introduction path is arranged in at least any one of the at least two processing surfaces, and of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

In addition, the present invention may be executed as an embodiment wherein the metal and/or the metal compound is one kind selected from nickel, silver, a nickel compound, and a silver compound, and the reducing agent is a reducing agent to separate at least any one kind selected from nickel and silver.

In addition, the present invention may be executed as an embodiment wherein the at least one metal compound is a nickel compound and the at least one reducing agent is a reducing agent to separate nickel, and average value of particle diameter of the nickel microparticles to be separated is 350 nm or less.

According to mere one embodiment of the present invention, the present invention may be carried out as a method for producing a metal microparticle, wherein the method comprises:

a fluid pressure imparting mechanism for imparting a pressure to a fluid to be processed, a first processing member provided with a first processing surface of the at least two processing surfaces, a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, in this thin film fluid, whereby separating metal microparticle as a method for producing metal microparticle.

According to the present invention, it was found that the particle diameter of the metal microparticles to be separated and the coefficient of variation thereof could be controlled by the way in which the fluid which contained at least one metal and/or metal compound and the fluid which contained at least one reducing agent were mixed in the thin film fluid formed between at least two processing surfaces which are disposed in a position they are faced with each other so as to be able to approach to and separate from each other, at least one of which rotates relative to the other whereby separating the metal microparticles, wherein of the fluid which contained at least one metal and/or metal compound and the fluid which contained at least one reducing agent, at least any one fluid to be processed contained a water-containing polyol in which water and a polyol were mixed but did not contain a monovalent alcohol, and the ratio of water in the water-containing polyol was controlled; and it was also found that by controlling the ratio of water in the water-containing polyol so as to be in the range of 5 to 60% by weight, the coefficient of variation could be controlled in the range of less than 5%. In addition, it was also found that when the fluid which contained at least one metal and/or metal compound was made to contain the water-containing polyol, and also the ratio of water in the water-containing polyol was made higher, the amount of production of the metal microparticle per a unit time could be increased, and it also became possible to continuously and stably produce large quantity of the metal microparticle whose particle diameter was controlled, which had been difficult by conventional producing methods thereof. In addition, by controlling the ratio of water in the water-containing polyol which was contained in any one of the fluids, the fluid which contained at least one metal and/or metal compound and the fluid which contained at least one reducing agent, it became also possible to lower the reaction temperature to separate the metal microparticle; and therefore, the metal microparticles controlled so as to have different particle diameters could be produced with a lower cost and a lower energy than ever; and as a result, it became possible to provide not only the metal microparticle cheaply and stably but also the metal microparticle having good dispersibility.

Figure 3A:
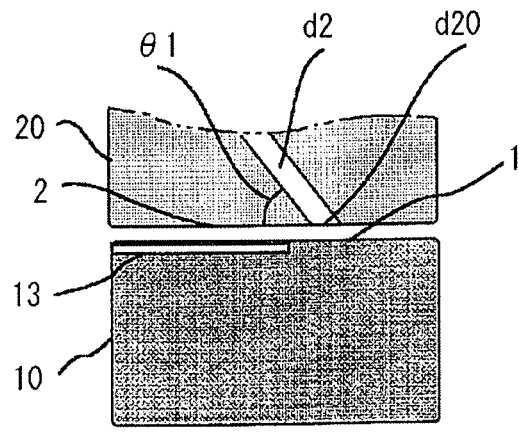

FIG. 3(A) a cross section view of the second introduction part of the apparatus; and 3(B) is the enlarged figure of the processing surface to explain the second introduction part.

Figure 4:
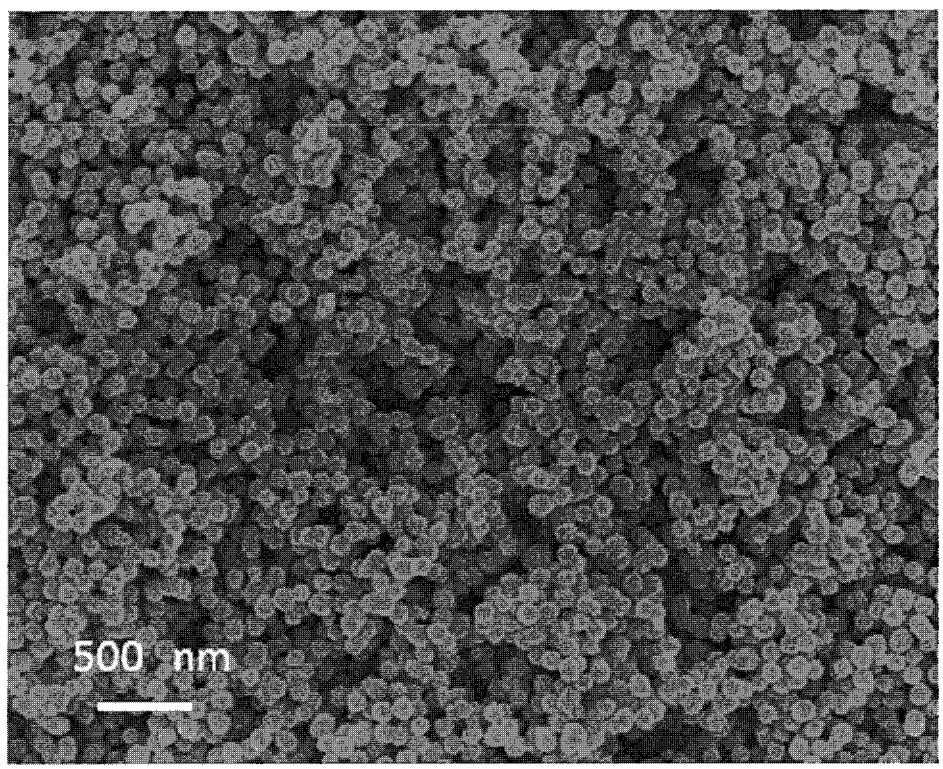

FIG. 4 is the SEM picture of the prepared nickel microparticles which is obtained in Sample 4.

Figure 5:
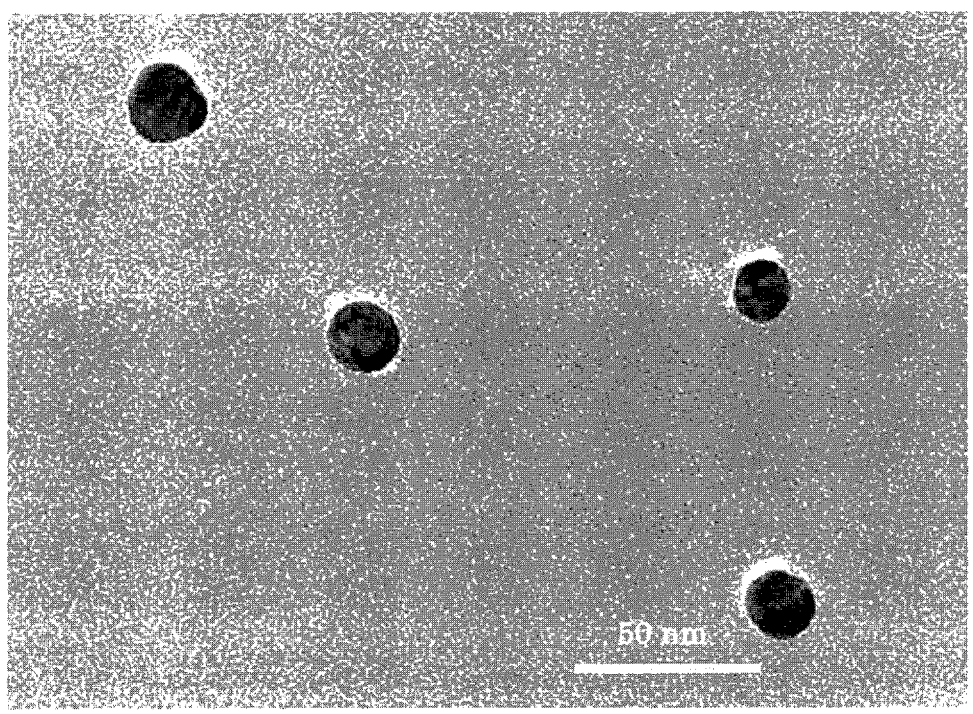

FIG. 5 is the TEM picture of the prepared silver microparticles which is obtained in Sample 11.

Figure 6:
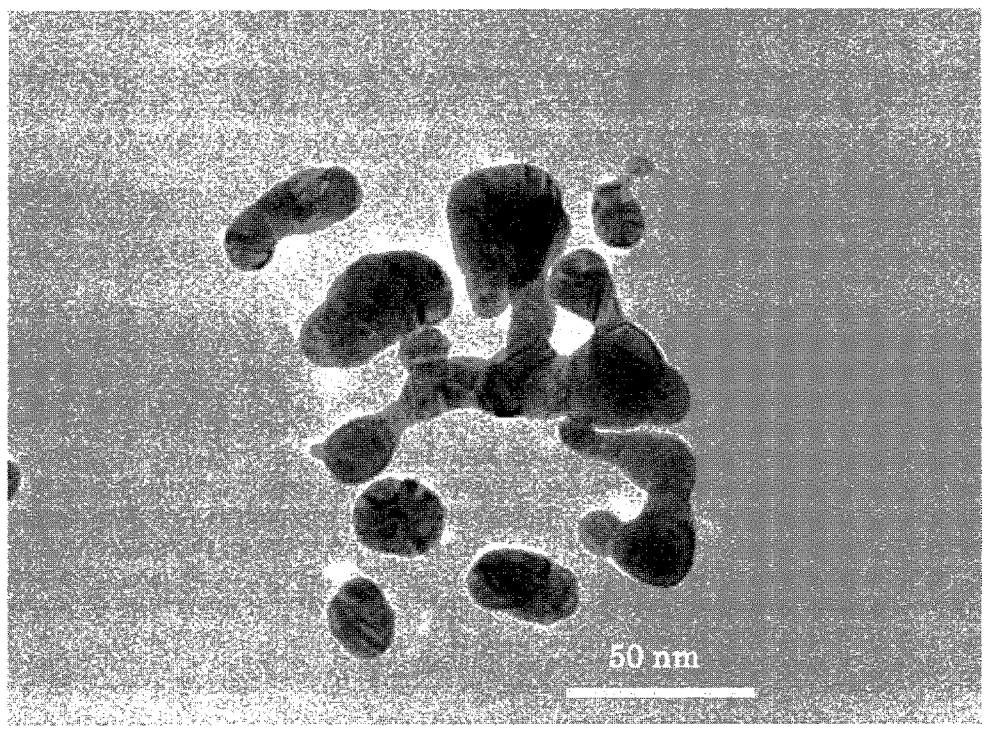

FIG. 6 is the TEM picture of the prepared silver microparticles which is obtained in Sample 16.

Figure 7:
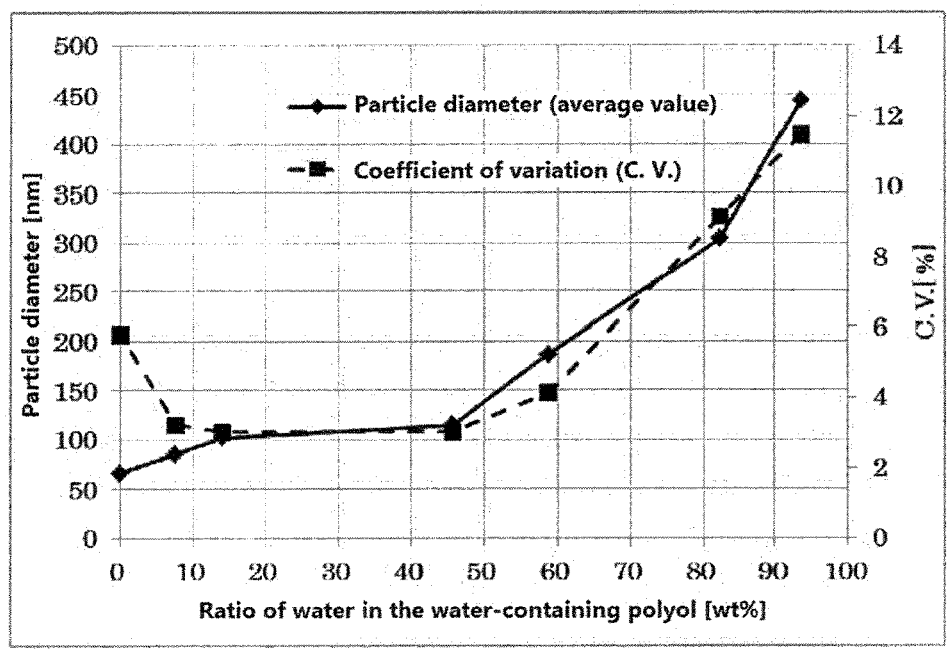

FIG. 7 is the graph showing changes of the particle diameter (average value) of the nickel microparticle and of the coefficient of variation (C. V.) thereof relative to the ratio of water in the water-containing polyol which is used in the first fluid in Samples 1 to 7.

Figure 8:
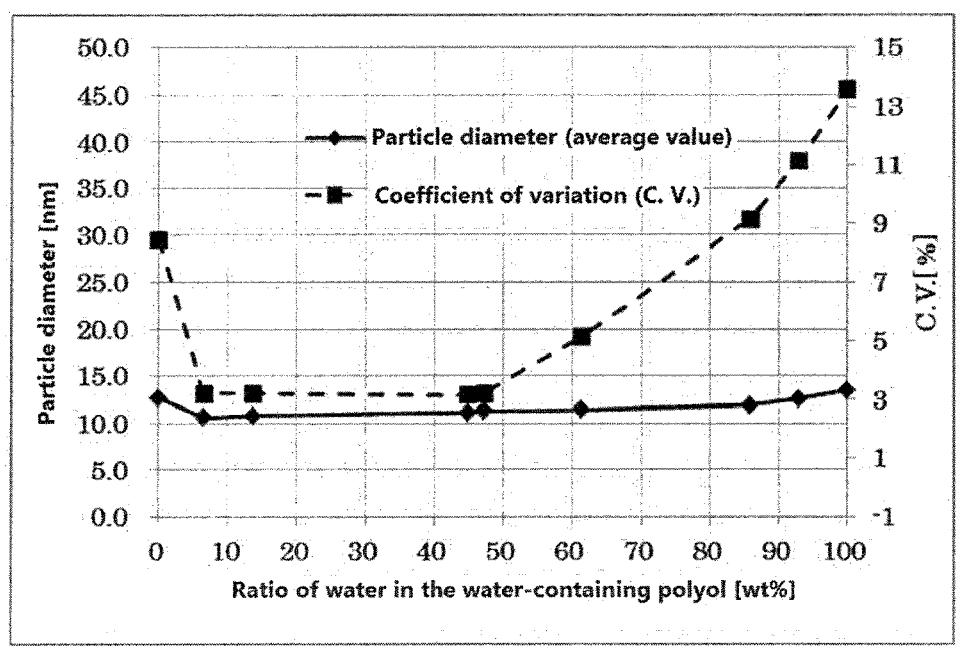

FIG. 8 is the graph showing changes of the particle diameter (average value) of the silver microparticle and of the coefficient of variation (C. V.) thereof relative to the ratio of water in the water-containing polyol which is used in the first fluid in Samples 8 to 16.

Figure 9:
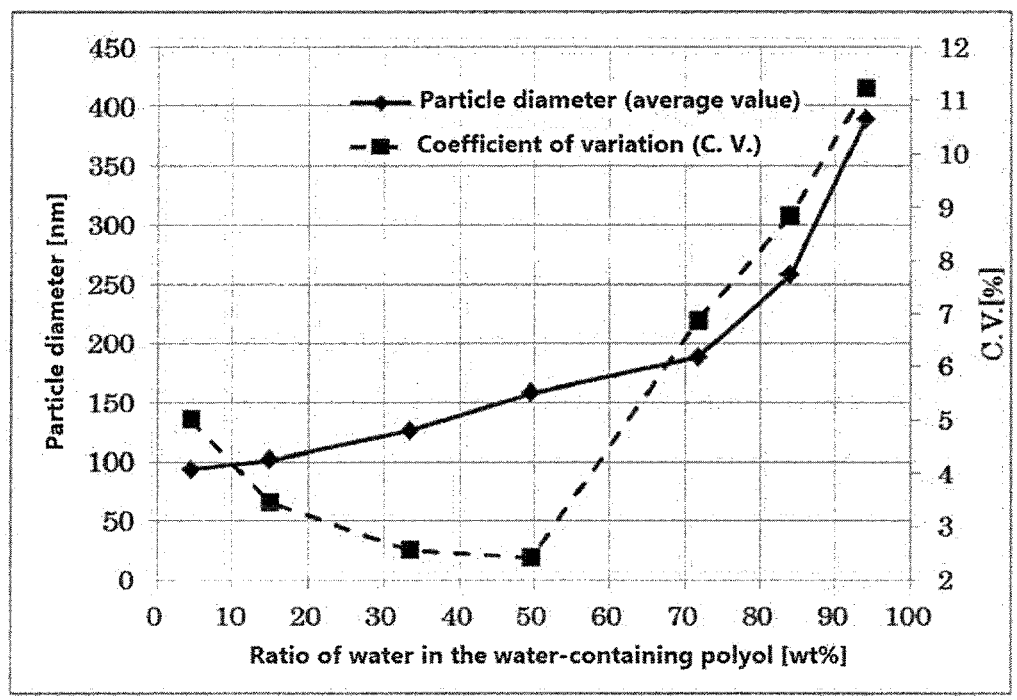

FIG. 9 is the graph showing changes of the particle diameter (average value) of the nickel microparticle and of the coefficient of variation (C. V.) thereof relative to the ratio of water in the water-containing polyol which is used in the first fluid in Samples 18 to 24.

Figure 10:
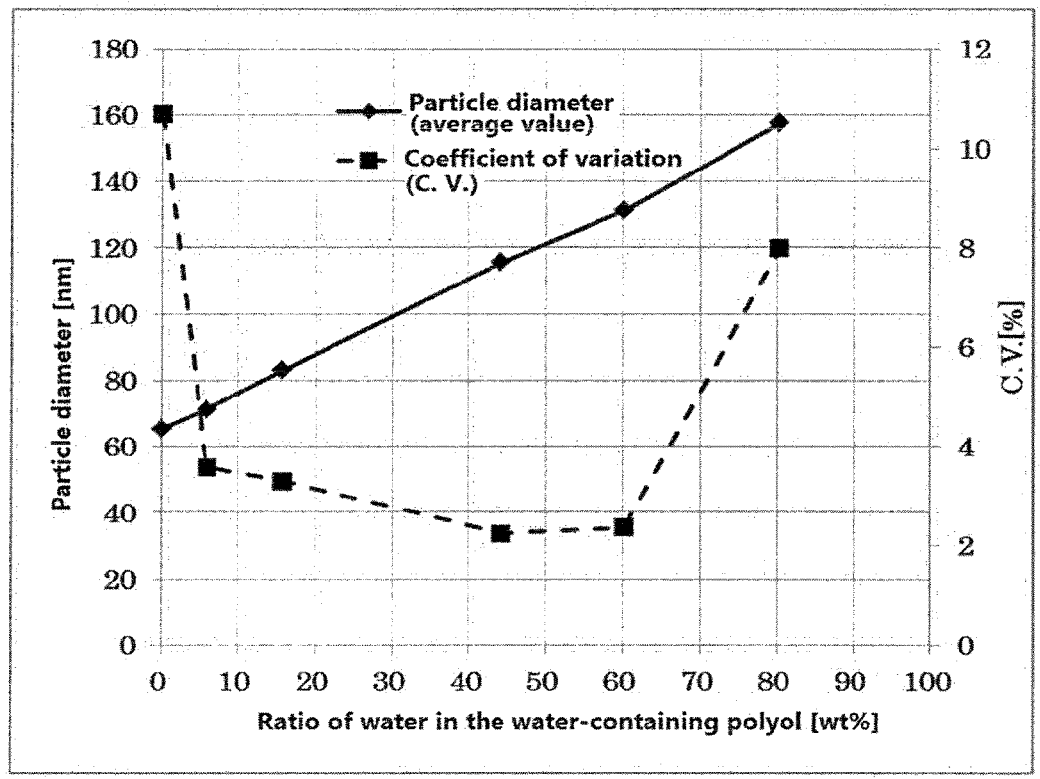

FIG. 10 is the graph showing changes of the particle diameter (average value) of the nickel microparticle and of the coefficient of variation (C. V.) thereof relative to the ratio of water in the water-containing polyol which is used in the first fluid in Samples 25 to 30.

Figure 11:
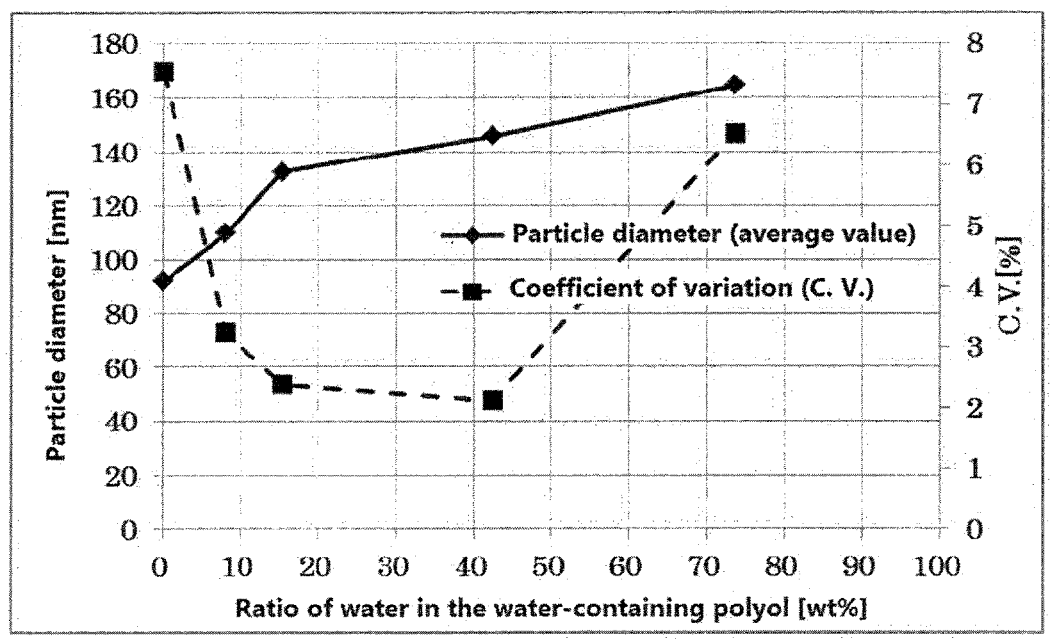

FIG. 11 is the graph showing changes of the particle diameter (average value) of the nickel microparticle and of the coefficient of variation (C. V.) thereof relative to the ratio of water in the water-containing polyol which is used in the first fluid in Samples 32 to 36.

Figure 12:
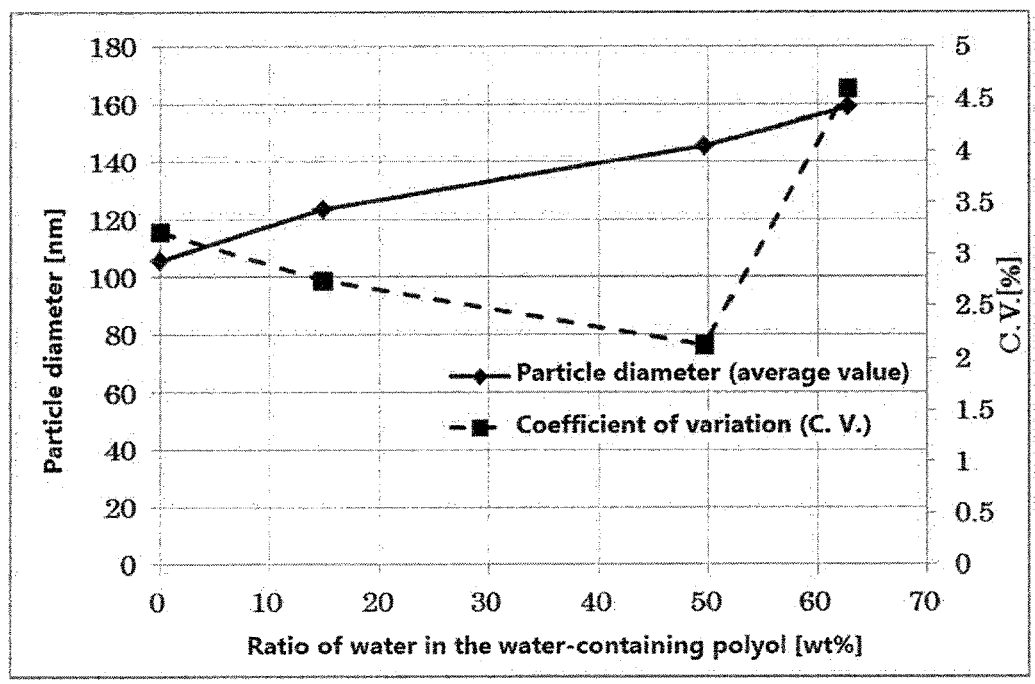

FIG. 12 is the graph showing changes of the particle diameter (average value) of the nickel microparticle and of the coefficient of variation (C. V.) thereof relative to the ratio of water in the water-containing polyol which is used in the second fluid in Samples 37, 38, 35 and 39.

Figure 13:
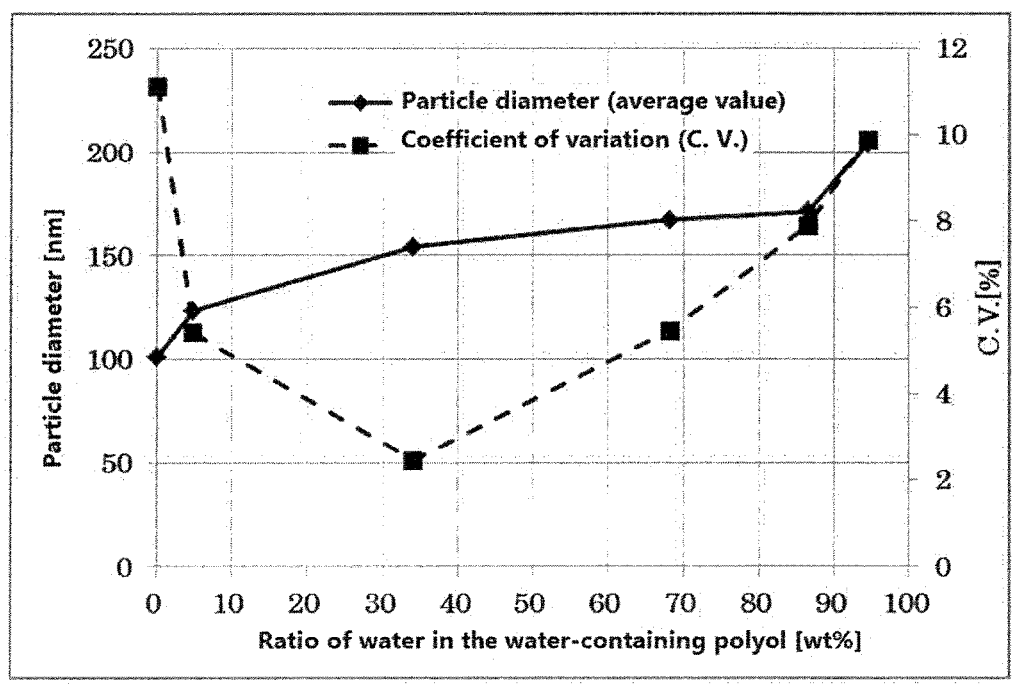

FIG. 13 is the graph showing changes of the particle diameter (average value) of the nickel microparticle and of the coefficient of variation (C. V.) thereof relative to the ratio of water in the water-containing polyol which is used in the first fluid in Samples 40 to 45.

Hereunder, based on the drawings, one embodiment of the present invention will be explained specifically.

Metals:

Metals in the present invention are not particularly restricted. All metal elements in the periodical table may be used. Illustrative example thereof includes Ti, Fe, W, Pt, Au, Cu, Ag, Pd, Ni, Mn, Co, Ru, V, Zn, Zr, Sn, In, Te, Ta, Bi, and Sb. These metals may be constituted of a single element; or an alloy formed of a plurality of metal elements or a substance which contains a metal element and a non-metal element may be used. Naturally, an alloy formed of a precious metal and a non-precious metal may be used.

Metal Compounds:

The metal compound of the present invention is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate, a nitrite, a sulfate, a sulfite, a formate, an acetate, a phosphate, a phosphite, a hypophosphite, a chloride, an oxysalt, an acetylacetonato salt, and a hydrate or an organic solvent adduct of them. These metal compounds may be used singly or as a mixture of two or more of them.

Reducing Agents:

The reducing agent used in the present invention is a substance capable of reducing any one of a metal and a metal compound or both and is not particularly restricted; though a substance capable of reducing a metal ion is preferable. Illustrative example thereof includes hydrazine, hydrazine monohydrate, formaldehyde, sodium sulfoxylate, a boron hydride metal salt, an aluminum hydride metal salt, a triethylboron hydride metal salt, glucose, citric acid, ascorbic acid, tannic acid, dimethylformamide, tetrabutylammonium borohydride, sodium hypophosphite ($NaH_2PO_2$), and a metal compound or an ion thereof, preferably a transition metal or an ion thereof, such as iron and titanium. These reducing agents each may be used singly or as a mixture of them.

In the present invention, the fluid which contains at least one metal and/or metal compound is used; and it is preferable that the at least one metal and/or metal compound be mixed with a solvent whereby this mixture is used as a dissolved solution or a molecular disperse solution thereof.

In addition, in the present invention, the fluid which contains at least one reducing agent is used, wherein it is preferable that the at least one reducing agent be mixed with a solvent whereby this mixture is used as a dissolved solution or a molecular disperse solution thereof.

In addition, it is preferable that of the fluid which contains at least one metal and/or metal compound and the fluid which contains at least one reducing agent, at least any one of these fluids contains the later-mentioned water-containing polyol while not containing a monovalent alcohol such as methanol and ethanol, and also of a solvent used in the fluid which contains at least one metal and/or metal compound and a solvent used in the fluid which contains at least one reducing agent, in at least any one of these solvents, the said water-containing polyol be used.

Water-Containing Polyol:

The water-containing polyol to be used in the present invention is a mixture of water with a polyol. This water is not particularly restricted; and illustrative example thereof includes ion-exchanged water, RO water, purified water, and ultra-purified water. The polyol is an alcohol of divalent or of a higher valency; and illustrative example thereof includes ethylene glycol, propylene glycol, trimethylene glycol, tetraethylene glycol, diethylene glycol, glycerin, polyethylene glycol, and polypropylene glycol.

In the present invention, by controlling the ratio of water which is contained in the water-containing polyol, the particle diameter of the metal microparticle to be obtained and the coefficient of variation thereof can be controlled. Corresponding to the targeted metal and the desirable particle diameter, this ratio may be controlled in practice.

The coefficient of variation in the particle diameter is the indicator with which uniformity of the obtained metal microparticles can be seen; and this can be obtained from the average particle diameter in the particle diameter distribution of the metal microparticles and the standard deviation thereof based on the equation: Coefficient of Variation (C.V.) (%)=Standard Deviation÷Average Particle Diameter× 100. As the value of this coefficient of variation becomes smaller, distribution of the particle diameters of the obtained metal microparticles becomes narrower so that uniformity of the metal microparticles becomes higher. On the contrary, as the value of this coefficient of variation becomes larger, uniformity of the metal microparticles becomes lower; and thus, for example, when these metal microparticles are industrially used, the metal microparticles not having the necessary sizes in the particle diameter need to be removed by a classification operation; and therefore, this may cause this kind of problem or the like.

In the polyol reducing method, the reducing power thereof is generally dependent on the temperature during reduction, the kind of metal salt, the kind of polyol, and the like. In the present invention, the applicant of the present application presumes that in addition to control of the reducing power by the temperature during reduction, the kind of metal salt, and the kind of polyol, by controlling the ratio of water which is contained in the water-containing polyol, the particle diameter of the metal microparticle to be obtained and the coefficient of variation thereof can be controlled. Here, the polyol reducing method includes not only the reduction of a metal ion by a polyol but also the reduction of a metal ion by using a polyol together with other reducing agent.

In the present invention, it is preferable that the particle diameter of the metal microparticles to be obtained be controlled in such a way that the particle diameter thereof may become larger by increasing the ratio of water in the water-containing polyol, and that the particle diameter thereof may become smaller by decreasing the ratio of water in the water-containing polyol. In addition, it is preferable that the coefficient of variation of the particle diameter in the metal microparticles to be obtained be controlled in such a way that the coefficient of variation of the particle diameter thereof may be in the range of less than 5% by controlling the ratio of water in the water-containing polyol so as to be in the range of 5 to 60% by weight.

In addition, it is preferable to dissolve at least one metal and/or metal compound into the water-containing polyol thereby making the fluid in which at least one metal and/or metal compound is contained. Generally, when only a polyol is used as the solvent, solubility of a metal and/or a metal compound therein is lower as compared with the case that only water is used as the solvent. By using the water-containing polyol as the solvent, the concentration of a metal and/or a metal compound in the fluid which contains at least one metal and/or metal compound can be made higher as compared with the case that only the polyol is used as the solvent; and thus, especially when the equipment capable of continuous production such as the fluid processing apparatus as mentioned later is used, the production amount and production efficiency thereof can be enhanced dramatically.

Separation of Metal Microparticles:

In the present invention, the ratio of water in the water-containing polyol is preferably controlled in the range of 5 to 60% by weight, or more preferably in the range of 10 to 55% by weight. In this way, the coefficient of variation of the particle diameters of the metal microparticle to be obtained can be controlled in the range of less than 5%. If the ratio of water in the water-containing polyol is outside the range of 5 to 60% by weight, the coefficient of variation of the particle diameters of the metal microparticle to be obtained becomes 5% or more. As the reason for this, the applicant of the present application presumes that the reducing power of the polyol and the mixing ratio of water to the polyol in the water-containing polyol affect the coefficient of variation of the particle diameters of the metal microparticle to be obtained.

In addition, mixing with water brings about an advantageous effect to lower the risk of the polyol as the flammable liquid; and moreover, if the ratio of water in the water-containing polyol goes beyond 40% by weight, there is a merit that this mixture becomes outside the application of the regulation as the dangerous substance.

Other Solvents:

The solvent other than the water-containing polyol used in the present invention is not particularly restricted, so that various kinds of solvent may be used. Illustrative example of the solvent other than the water-containing polyol includes water and the polyols which are used in the water-containing polyol; alcoholic organic solvents such as methanol and ethanol; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. In addition, acidic substances which will be described later may be used as the solvent other than the water-containing polyol. Each of these solvents may be used singly or as a mixture of plurality of them.

In addition, in the present invention, in the water-containing polyol as a solvent other than water and the polyol may be used to the degree not adversely affecting the present invention, or may not be used, as well. Illustrative example of the solvent other than water and the polyols includes ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. Each of these solvents may be used singly or as a mixture of plurality of them.

In addition, if the alcoholic organic solvents or the polyols as mentioned above are used as the solvent, there is a merit that these solvents work as the reducing agents by themselves.

However, in order to conveniently carry out the control of the present invention, it is more advantageous not to contain the monovalent alcohol in the fluid to be processed.

In addition, in the water-containing polyol or in the solvents other than the water-containing polyol, a basic substance or an acidic substance may be used as a mixture therewith or as a dissolved solution therein. Illustrative example of the basic substance includes metal hydroxides such as sodium hydroxide and potassium hydroxide; metal alkoxides such as sodium methoxide and sodium isopropoxide; and amine compounds such as triethylamine, 2-diethylamino ethanol, and diethylamine. Illustrative example of the acidic substance includes inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, and trichloroacetic acid.

Fluid Processing Apparatus:

In the present invention, it is preferable to use the method wherein the fluid which contains at least one kind of metal and/or metal compound and the fluid which contains at least one kind of reducing agent are mixed in the thin film fluid formed between processing surfaces which are disposed in a position they are faced with each other so as to be able to approach to and separate from each other, at least one of which rotates relative to the other; and thus, for example, it is preferable to mix these fluids thereby separating the metal microparticle by using the apparatus based on the same principle as the apparatus shown in Patent Document 6.

Hereinafter, embodiments of the above-mentioned fluid processing apparatus will be explained by using the drawings.

Explanation of the Apparatus

Figure 1:
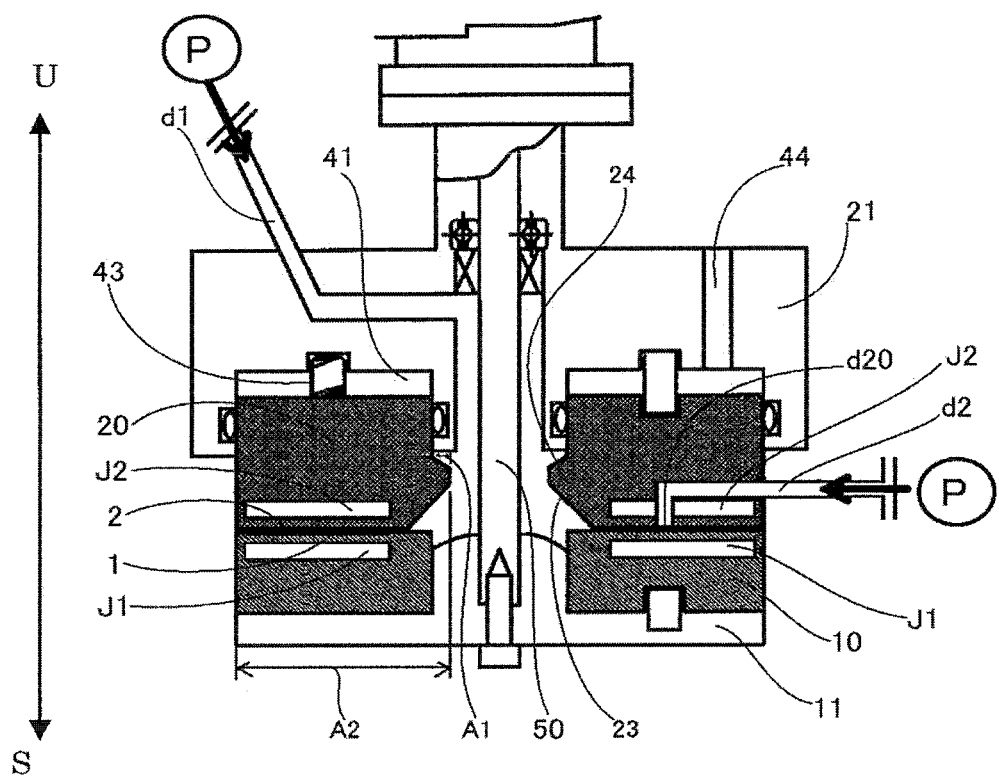
FIG. 1 is a rough cross section view of the fluid processing apparatus according to an embodiment of the presently applied invention.
Figure 2A:
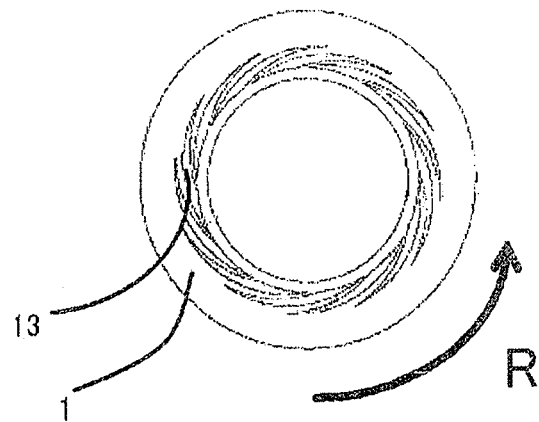
FIG. 2(A) is a rough top view of the first processing surface of the fluid processing apparatus which is shown in FIGS. 1; and 2(B) is the enlarged figure of the essential part of the processing surface of the apparatus.
Figure 2B:
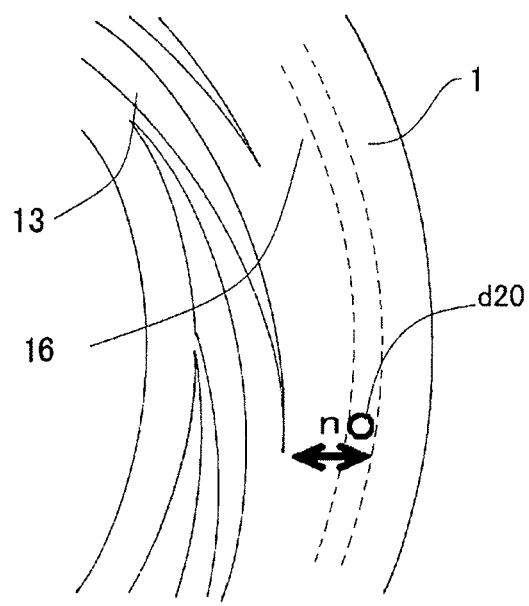
Figure 3B:
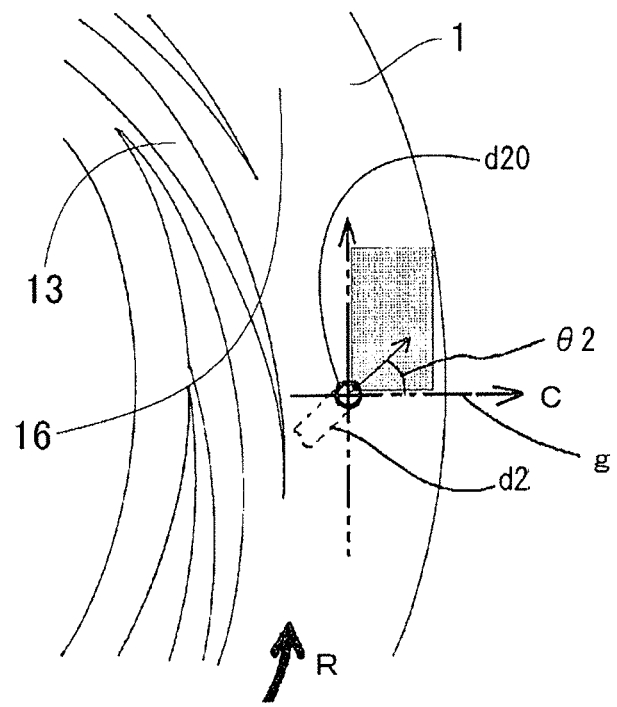

The fluid processing apparatus shown in FIG. 1 to FIG. 3 which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate only a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20.

This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P=P1\times(K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the movement of fluid, the dimensionless number which expresses the ratio of inertia force to viscosity force is called as Reynolds number, which is expressed by the following equation.

$$\text{Reynolds number } Re=\text{inertia force/viscosity force}=\rho VL/\mu=VL/\nu$$

Here, $\nu=\mu/\rho$ shows dynamic viscosity, V shows representative velocity, L shows representative length, $\rho$ shows density, and $\mu$ shows viscosity.

Flow of the fluid changes at the borderline of the critical Reynolds number; namely below the critical Reynolds number is the laminar flow, while above the critical Reynolds number is the turbulent flow.

Because the space between the processing surfaces 1 and 2 of the fluid processing apparatus is controlled so narrow that amount of the fluid that kept between the processing surfaces 1 and 2 is extremely small. Therefore, the representative length L is very short, so that the centrifugal force of the thin film fluid which passes through between the processing surfaces 1 and 2 is so small that the effect of the viscosity force in the thin film fluid becomes large. Accordingly the Reynolds number becomes smaller so that the thin film fluid becomes the laminar flow.

The centrifugal force, one of the inertia forces in rotation movement, is a force acting from a center to an outside. The centrifugal force can be expressed by the following equation.

$$\text{Centrifugal force } F=ma=mv^2/R$$

Here, "a" shows acceleration, "m" shows mass, "v" shows velocity, and R shows radius.

As mentioned above, amount of the fluid kept between the processing surfaces 1 and 2 is so small so that the ratio of the velocity relative to the fluid mass becomes very large, so that the said mass can be neglected. Accordingly, the effect of gravity can be neglected in the thin film fluid formed between the processing surfaces 1 and 2. Because of this, a microparticle of an alloy or a composite metal compound which contains two or more metal elements having different specific gravities can be separated in the thin film fluid formed between the processing surfaces 1 and 2, even though these are intrinsically difficult to be separated as the microparticle.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening part d20 may be circular as shown by the solid lines in FIG. 2(B) and FIG. 3(B), or a concentric circular ring shape which encloses the central opening of the processing surface 2 having a form of a ring-like disk as shown by the dotted lines in FIG. 2(B). The opening part d20 with the circular ring shape may not be necessarily arranged in the way that it encircles concentrically around the central opening of the processing surface 2. In the case that the opening part is made in the circular ring shape, the opening part having the circular ring shape may be continuous or discontinuous.

If the opening part d20 having the circular ring shape is arranged in the way that it encircles concentrically around the central opening of the processing surface 2, the second fluid that is introduced into between the processing surfaces 1 and 2 can be introduced under the same condition, so that the fluid processing including diffusion, reaction, and separation may be done more uniformly. If the microparticle is wanted to be produced in large quantity, the shape of the opening part is preferably made in the circular ring shape.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned fluid processing apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing metal microparticles by using the above-mentioned apparatus will be explained.

In the fluid processing apparatus as mentioned above, the fluid which contains at least one metal and/or metal compound is mixed with the fluid which contains at least one reducing agent in the thin film fluid formed between the processing surfaces 1 and 2 which are disposed in a position they are faced with each other so as to be able to approach to and separate from each other, at least one of which rotates relative to the other, whereby separating the metal microparticles. During this process, at least any one of the fluids, the fluid which contains at least one metal and/or metal compound and the fluid which contains at least one reducing agent, contains the water-containing polyol without containing a monovalent alcohol, and wherein the ratio of water which is contained in the water-containing polyol is controlled.

The separation of the metal microparticles takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the fluid containing at least one kind of metal and/or metal compound is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Next, from the second introduction part d2, which is the separate flow path, the fluid containing at least one kind of reducing agent is introduced as the second fluid directly into the first fluid film formed between the processing surfaces 1 and 2.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby separating the metal microparticles.

At this time, if the first fluid, i.e., the fluid which contains at least one metal and/or metal compound, contains one metal element, the metal microparticle of this single metal element can be separated; or if this fluid contains two or more metal elements, the alloy particle of these metal elements can be separated.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned above, in addition to the first introduction part d1 and the second introduction part d2, the third introduction part d3 may be formed in the processing apparatus; however, in this case, each fluid may be introduced into the processing apparatus separately from the respective introduction parts in such a way, for example, that the fluid which contains at least one metal and/or metal compound is introduced as the first fluid, the fluid which contains at least one metal and/or metal compound other than the metal and/or the metal compound used in the first fluid is introduced as the second fluid, and the fluid which contains at least one reducing agent is introduced as the third fluid. By so doing, concentration and pressure of each fluid can be controlled separately so that the separation reaction and particle diameter of the microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided. By introducing the plural fluids which contain at least one metal and/or metal compound from different introduction parts in the way as mentioned above, the alloy particle in the core-shell type or the like may be produced. In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

pH Region:

In the present invention, pH of the fluid which contains at least one metal and/or metal compound and pH of the fluid which contains at least one reducing agent are not particularly restricted. These can be arbitrarily changed depending on the kinds and concentrations of the reducing agent and of the metal and/or the metal compound to be used as well as depending on the purpose and the targeted metal.

Dispersant, Etc.:

In the present invention, in accordance with the purpose and the necessity thereof, various kinds of dispersant and surfactant may be used. There are no particular restrictions on them, so that generally used various surfactants and dispersants that are commercially available goods and products, newly synthesized substances, or the like may be used. Anionic surfactants, cationic surfactant, nonionic surfactants, and various polymer dispersants may be exemplified for them, though not limited to these surfactants and dispersants. These may be used solely or as a combination of two or more of them. When polyethylene glycol, polypropylene glycol, or the like is used as the polyol, these polyols can function as the dispersants as well.

Temperature:

In the present invention, temperature at the time of mixing of the metal solution with the reducing fluid is not particularly restricted. Temperature may be appropriately selected in accordance with the kind of the reducing agent and the kind of any one of the metal and the metal compound or both to be used, the kind of the metal to be targeted, the pH, and so forth.

The Case that Oxide or Hydroxide is Included:

In addition, the presently applied invention may be executed as the embodiment in which the metal microparticle partly contains an oxide, a hydroxide, an oxyhydroxide, or the like.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

In addition, the opening part d20 of the second introduction part d2 having a concentric circular ring shape which encloses the central opening of the processing surface 2 as shown by the dotted lines in FIG. 2(B) was used.

Observation by the Scanning Electron Microscope:

Observation by the scanning electron microscope (SEM) was made by using the field-emission-type scanning electron microscope (FE-SEM) (JSM-7500F, manufactured by JEOL Ltd.) to observe the obtained metal microparticle powders. The observation conditions with the acceleration voltage of 15 kV and the magnification of 5,000 or more were used, wherein the diameters of the primary particles of the metal microparticles confirmed by the SEM observation were taken as the particle diameter, and the average value of the particle diameters of 100 primary particles was taken as the average value of the particle diameters. In addition, the coefficient of variation (C. V.) was calculated by the equation: C. V.=Standard Deviation÷Average Particle Diameter× 100(%).

Measurement of the X-Ray Diffraction:

Measurement of the X-ray diffraction (XRD) was made by using the powder X-ray diffraction measurement instrument X'pert PRO MPD (XRD; manufactured by Panalytical Business Unit of Spectris Co., Ltd.). The measurement conditions were as follows: Cu anticathode, tube voltage of 45 kV, tube current of 40 mA, 0.016 step/10 second, and the measurement range of 10 to 100°/2θ (Cu). The crystallite's diameter of the dry powder of the obtained nickel microparticle was calculated from the results of the XRD measurement. The peak confirmed at 47.3° C. was used for the polycrystalline silicon plate, and the Scherrer's equation, $D=K·\lambda/(\beta·\cos\theta)$, was applied to the peak appeared near to 44.5° in the obtained nickel diffraction pattern.

Here, K is the Scherrer's constant and K=0.9 was taken. The calculation was made from the equation, wherein $\lambda$ is the wavelength of the used X-ray tube, $\beta$ is the half width, and $\theta$ is the diffraction angle.

Transmission Electron Microscope:

For the observation with a transmission electron microscope (TEM), by using the transmission electron microscope JEM-2100 (manufactured by JEOL Ltd.) the powder of the obtained metal microparticle was observed. Observation conditions with the acceleration voltage of 200 kV and the magnification of 30,000 or more were used; and as to the particle diameter, the particle diameter of the primary particle of the metal microparticle confirmed by the TEM observation was taken as the particle diameter whereby the average value of diameters of the 100 primary particles was taken as the average value. In addition, the coefficient of variation (C. V.) was calculated by the equation: C. V.=Standard Deviation÷Average Particle Diameter×100(%).

By using the fluid processing apparatus shown in FIG. 1, the fluid containing nickel compound and the fluid containing reducing agent as samples 1 to 7 are mixed in the thin film fluid formed between the processing surfaces 1 and 2 which are disposed in a position they are faced with each other so as to be able to approach to and separate from each other, at least one of which rotates relative to the other, whereby the nickel microparticle is prepared as the metal microparticle in this thin film fluid.

While supplying, as the first fluid, the fluid which contained the nickel compound from the center with the supply pressure of 0.50 MPaG and the rotation number of 1700 rpm, the fluid which contained the reducing agent was introduced as the second fluid into between the processing surfaces 1 and 2, whereby the first fluid and the second fluid were mixed in the thin film fluid. The disperse solution of the nickel microparticles was discharged from between the processing surfaces 1 and 2. This discharged disperse solution of the nickel microparticles was put on a magnet to settle the nickel microparticles; and after the supernatant solution thereof was removed, the washing operation by using pure water was repeated for 3 times. The obtained wet cake was dried under an atmospheric pressure at 25° C. to obtain the dry powder of the nickel microparticles. As a result of the XRD measurement of the powders obtained after drying the nickel microparticles, it was found that this has the crystal structure which agreed with the FCC-type nickel; and in addition, by the ICP measurement of the solution which was obtained by dissolving this powders into nitric acid $HNO_3$, it was found that the nickel microparticles without containing impurities was produced. In addition, the particle diameters of the nickel microparticles were confirmed by the SEM observation; and the average value of the particle diameters thereof and the coefficient of variation of the particle diameters were calculated. In addition, the diameter of the crystallite thereof was calculated by the X-ray diffraction (XRD) measurement.

In Table 1 and Table 2, the process conditions (recipes and operation conditions) of the first fluid and the second fluid are shown. In addition, in Table 1, the ratio of water in the water-containing polyol used in the first fluid is shown; and in Table 2, the average value of the particle diameters of the obtained nickel microparticles (this is shown in Table 2 as "particle diameter), the coefficient of variation (C. V.) of the particle diameters thereof, and the diameter of the crystallite are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; $NiSO_4 \cdot 6H_2O$ for nickel sulfate hexahydrate; EG for ethylene glycol; PEG 600 for polyethylene glycol 600; PW for pure water; HMH for hydrazine monohydrate; and KOH for potassium hydroxide. In addition, the water content originally contained in ethylene glycol which was used in this Example was less than 1.0% by weight, so that the water originally contained therein is not considered. In addition, the SEM picture of the nickel microparticles obtained in Sample 4 is shown in FIG. 4. In addition, in FIG. 7, the changes of the particle diameter (average value) of the nickel microparticle and of the coefficient of variation of the particle diameters (C. V.) relative to the ratio of water in the water-containing polyol used in Samples 1 to 7 for the first fluid are shown.

TABLE 1

First fluid: recipes and operation conditions

| Sample | Concentration (mol/L) NiSO$_4$•6H$_2$O | Concentration (% by weight) PEG600 | EG | PW | Flow rate (mL/minute) | Temperature (° C.) | Ratio of water in the water-containing polyol (% by weight) |
|---|---|---|---|---|---|---|---|
| 1 | 0.2 | 0.76 | 94.79 | 0.00 | 400 | 143 | 0.00 |
| 2 | 0.2 | 0.80 | 87.29 | 7.22 | 400 | 141 | 7.58 |
| 3 | 0.2 | 0.80 | 81.12 | 13.39 | 400 | 140 | 14.05 |
| 4 | 0.2 | 0.81 | 50.96 | 43.45 | 400 | 130 | 45.63 |
| 5 | 0.2 | 0.81 | 38.45 | 55.92 | 400 | 130 | 58.75 |
| 6 | 0.2 | 0.85 | 15.96 | 78.19 | 400 | 125 | 82.31 |
| 7 | 0.2 | 0.85 | 5.32 | 88.83 | 400 | 125 | 93.51 |

TABLE 2

| Sample | Second fluid: recipes and operation conditions Concentration (% by weight) HMH | KOH | PW | Flow rate (mL/minute) | Temperature (° C.) | Particle diameter (nm) | C.V. (%) | Crystallite diameter (nm) |
|---|---|---|---|---|---|---|---|---|
| 1 | 70.00 | 10.00 | 20.00 | 50 | 25 | 66.7 | 5.78 | 16.2 |
| 2 | 70.00 | 10.00 | 20.00 | 50 | 25 | 85.6 | 3.21 | 18.9 |
| 3 | 70.00 | 10.00 | 20.00 | 50 | 25 | 101.9 | 3.01 | 30.0 |
| 4 | 70.00 | 20.00 | 10.00 | 50 | 25 | 114.6 | 3.01 | 30.5 |
| 5 | 70.00 | 20.00 | 10.00 | 50 | 25 | 186.4 | 4.12 | 30.5 |
| 6 | 70.00 | 20.00 | 10.00 | 50 | 25 | 304.0 | 9.12 | 35.5 |
| 7 | 70.00 | 20.00 | 10.00 | 50 | 25 | 444 | 11.45 | 42.9 |

From Samples 1 to 7, it was confirmed that by controlling the ratio of water in the water-containing polyol which is contained in the first fluid, the particle diameter of the nickel microparticle, the coefficient of variation thereof, and the diameter of the crystallite can be controlled. Specifically, it was confirmed that by raising the ratio of water in the water-containing polyol, the control can be done such that the particle diameter of the nickel microparticle and the diameter of the crystallite thereof may be made larger; and on the other hand, by lowering the ratio of water in the water-containing polyol, the control can be done such that the particle diameter of the nickel microparticle and the diameter of the crystallite thereof may be made smaller. In addition, it was confirmed that by controlling the ratio of water in the water-containing polyol so as to be in the range of 5 to 60% by weight, the coefficient of variation of the particle diameters of the nickel microparticles can be controlled in the range of less than 5%.

In addition, it was confirmed that by raising the ratio of water in the water-containing polyol which is contained in the first fluid, it becomes possible to carry out the reducing reaction under a low temperature in the first fluid; and as a result, the reaction temperature to separate the nickel microparticles can be lowered, so that the nickel microparticles can be produced with a lower cost and a lower energy as compared with conventional producing methods.

On the other hand, in the first fluid of Sample 1 which used the polyol not containing water as the solvent, precipitates started to appear after 30 minutes since preparation of the first fluid at room temperature (25° C.), and these precipitates did not dissolve even heating the first fluid of Sample 1. Therefore, it was judged that the first fluid of Sample 1 is not suitable as the fluid to be used for production of the nickel microparticle.

By using the fluid processing apparatus shown in FIG. 1, the fluid containing silver compound and the fluid containing reducing agent as samples 8 to 16 are mixed in the thin film fluid formed between the processing surfaces 1 and 2 which are disposed in a position they are faced with each other so as to be able to approach to and separate from each other, at least one of which rotates relative to the other, whereby the silver microparticle is prepared as the metal microparticle in this thin film fluid.

While supplying, as the first fluid, the fluid which contained the silver compound from the center with the supply pressure of 0.15 MPaG and the rotation number of 1700 rpm, the fluid which contained the reducing agent was introduced as the second fluid into between the processing surfaces 1 and 2, whereby the first fluid and the second fluid were mixed in the thin film fluid. The disperse solution of the silver microparticles was discharged from between the processing surfaces 1 and 2. This discharged disperse solution of the silver microparticles was subjected to the centrifugal separation (18,000 G for 20 minutes) to settle the silver microparticles; and after the supernatant solution thereof was removed, the washing operation by using pure water was repeated for 3 times. The obtained wet cake was dried under an atmospheric pressure at 25° C. to obtain the dry powder of the silver microparticles. As a result of the XRD measurement and the ICP measurement of the powders obtained after drying the silver microparticles, it was found that the silver microparticles without containing impurities was produced. In addition, the particle diameters of the silver microparticles were confirmed by the TEM observation; and the average value of the particle diameters thereof and the coefficient of variation of the particle diameters were calculated. As will be mentioned later, in Samples 8, 13, 14, 15, and 16, the obtained silver microparticles agglomerated, so that the silver particles agglomerated and fused were observed, and the average value of the particle diameters thereof and the coefficient of variation of the particle diameters were calculated.

In Table 3 and Table 4, the process conditions (recipes and operation conditions) of the first fluid and the second fluid are shown. In addition, in Table 3, the production amount of the silver microparticle per the unit time (Ag production amount) and the ratio of water in the water-containing polyol used in the first fluid are shown; and in Table 4, the average value of the particle diameters of the obtained silver microparticles (this is shown in Table 4 as "particle diameter), and the coefficient of variation (C. V.) of the particle diameters thereof are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; AgNO$_3$ for silver nitrate; EG for ethylene glycol; PVP (K=30) for polyvinyl pyrrolidone (K=30); PW for pure water; HMH for hydrazine monohydrate; and KOH for potassium hydroxide. In addition, the water content originally contained in ethylene glycol which was used in this Example was less than 1.0% by weight, so that the water originally contained therein is not considered. In addition, the TEM picture of the silver microparticles obtained in Sample 11 is shown in FIG. 5, and the TEM picture of the silver microparticles obtained in Sample 16 is shown in FIG. 6. In addition, in FIG. 8, the changes of the particle diameter (average value) of the silver microparticles and of the coefficient of variation of the particle diameters (C. V.) relative to the ratio of water in the water-containing polyol used in Samples 8 to 16 for the first fluid are shown.

is contained in the first fluid, the particle diameter of the silver microparticle, the coefficient of variation thereof, and the diameter of the crystallite can be controlled. Specifically, it was confirmed, except sample 8, that by raising the ratio of water in the water-containing polyol, the control can be done such that the particle diameter of the silver microparticle thereof may be made larger; and on the other hand, by lowering the ratio of water in the water-containing polyol, the control can be done such that the particle diameter of the silver microparticle thereof may be made smaller. In addition, it was confirmed that by controlling the ratio of water in the water-containing polyol so as to be in the range of 5 to 60% by weight, the coefficient of variation of the particle diameters of the silver microparticles can be controlled in the range of less than 5%.

In Samples 8, 13, 14, 15, and 16, it was clearly confirmed that at about 10 minutes after the disperse solution of the silver microparticles was discharged from between the processing surfaces 1 and 2, the silver microparticles in the disperse solution of the silver microparticles were seen with the appearance of the agglomerated state thereof; and as shown in FIG. 6, the silver microparticles that were apparently agglomerated and fused were confirmed. On the other hand, in Samples 9 to 12, the situation was not confirmed that at about 10 minutes after the discharge, the silver microparticles in the disperse solution of the silver microparticles were seen with the appearance of the agglomerated state. Therefore, it was found that by using the water-containing polyol which was obtained by mixing pure

TABLE 3

First fluid: recipes and operation conditions

| | Concentration (mol/L) | Concentration (% by weight) | | Flow rate | Temperature | Ag production amount | Ratio of water in the water-containing polyol |
|---|---|---|---|---|---|---|---|
| Sample | AgNO$_3$ | EG | PW | (mL/minute) | (° C.) | (g/minute) | (% by weight) |
| 8 | 0.14 | 97.90 | 0.00 | 250 | 27 | 3.78 | 0.00 |
| 9 | 0.14 | 91.50 | 6.40 | 250 | 27 | 3.78 | 6.54 |
| 10 | 0.14 | 84.55 | 13.35 | 250 | 27 | 3.78 | 13.64 |
| 11 | 0.27 | 52.83 | 43.00 | 250 | 27 | 7.28 | 44.87 |
| 12 | 0.27 | 50.67 | 45.16 | 250 | 27 | 7.28 | 47.13 |
| 13 | 0.34 | 36.57 | 58.16 | 250 | 27 | 9.17 | 61.40 |
| 14 | 0.41 | 13.75 | 83.07 | 250 | 27 | 11.06 | 85.80 |
| 15 | 0.41 | 6.93 | 89.89 | 250 | 27 | 11.06 | 92.84 |
| 16 | 0.41 | 0.00 | 95.77 | 250 | 27 | 11.06 | 100.00 |

TABLE 4

Second fluid: recipes and operation conditions

| | Concentration (% by weight) | | | | Flow rate | Temperature | Particle diameter | C.V. |
|---|---|---|---|---|---|---|---|---|
| Sample | HMH | KOH | PVP (K = 30) | PW | (mL/minute) | (° C.) | (nm) | (%) |
| 8 | 7.00 | 3.00 | 10.00 | 80.00 | 100 | 24 | 12.7 | 8.45 |
| 9 | 7.00 | 3.00 | 10.00 | 80.00 | 100 | 24 | 10.6 | 3.21 |
| 10 | 7.00 | 3.00 | 10.00 | 80.00 | 100 | 24 | 10.8 | 3.21 |
| 11 | 7.00 | 3.00 | 10.00 | 80.00 | 100 | 24 | 11.1 | 3.15 |
| 12 | 7.00 | 3.00 | 10.00 | 80.00 | 100 | 24 | 11.3 | 3.21 |
| 13 | 7.00 | 3.00 | 10.00 | 80.00 | 100 | 24 | 11.4 | 5.14 |
| 14 | 7.00 | 3.00 | 10.00 | 80.00 | 100 | 24 | 11.9 | 9.12 |
| 15 | 7.00 | 3.00 | 10.00 | 80.00 | 100 | 24 | 12.6 | 11.12 |
| 16 | 7.00 | 3.00 | 10.00 | 80.00 | 100 | 24 | 13.5 | 13.56 |

From Samples 8 to 16, it was confirmed that by controlling the ratio of water in the water-containing polyol which water and ethylene glycol with the ratio of water in the water-containing polyol being in the range of 5 to 60% by weight, the silver microparticles which could be separated readily could be produced efficiently.

In addition, in the first fluid of Sample 8, the time required for dissolving AgNO₃ with concentration of 0.14 mol/L into the polyol comprising ethylene glycol without containing water was 2 hours or more; and AgNO₃ with concentration of higher than 0.14 mol/L could not be dissolved therein. However, as shown in Samples 9 to 16, when as the solvent for the first fluid, the water-containing polyol which was obtained by mixing ethylene glycol and water was used, dissolution of AgNO₃ into the solvent could be achieved in a short period of time; and in addition, when the ratio of water in the water-containing polyol which was contained in the first fluid was raised, it became possible to increase concentration of AgNO₃ in the first fluid, so that the amount of the silver microparticles produced per unit time in Samples 11 to 16 became larger than Sample 8. From the above, by letting the first fluid to contain the water-containing polyol, it became possible to increase the production amount of the silver microparticles.

By using the fluid processing apparatus shown in FIG. 1, the fluid containing silver compound and the fluid containing reducing agent as samples 17 to 24 are mixed in the thin film fluid formed between the processing surfaces 1 and 2 which are disposed in a position they are faced with each other so as to be able to approach to and separate from each other, at least one of which rotates relative to the other, whereby the silver microparticle is prepared as the metal microparticle in this thin film fluid.

While supplying, as the first fluid, the fluid which contained the nickel compound from the center with the supply pressure of 0.30 MPaG and the rotation number of 1700 rpm, the fluid which contained the reducing agent was introduced as the second fluid into between the processing surfaces 1 and 2, whereby the first fluid and the second fluid were mixed in the thin film fluid. The disperse solution of the nickel microparticles was discharged from between the processing surfaces 1 and 2. This discharged disperse solution of the nickel microparticles was put on a magnet to settle the nickel microparticles; and after the supernatant solution thereof was removed, the washing operation by using pure water was repeated for 3 times. The obtained wet cake was dried under an atmospheric pressure at 25° C. to obtain the dry powder of the nickel microparticles. As a result of the XRD measurement of the powders obtained after drying the nickel microparticle, it was found that this has the crystal structure which agreed with the Ni of the FCC type; and in addition, by the ICP measurement of the solution which was obtained by dissolving this powders into nitric acid HNO₃, it was found that the nickel microparticles without containing impurities was produced. In addition, the particle diameters of the nickel microparticles were confirmed by the SEM observation; and the average value of the particle diameters thereof and the coefficient of variation of the particle diameters were calculated. In addition, the diameter of the crystallite thereof was calculated by the X-ray diffraction (XRD) measurement.

In Table 5 and Table 6, the process conditions (recipes and operation conditions) of the first fluid and the second fluid are shown. In addition, in Table 5, the production amount of the nickel microparticle per the unit time (Ni production amount) and the ratio of water in the water-containing polyol used in the first fluid are shown; and in Table 6, the average value of the particle diameters of the obtained nickel microparticles (this is shown in Table 6 as "particle diameter), the coefficient of variation (C. V.) of the particle diameters thereof, and the diameter of the crystallite are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; NiSO₄.6H₂O for nickel sulfate hexahydrate; DEG for diethylene glycol; PEG 600 for polyethylene glycol 600; PW for pure water; HMH for hydrazine monohydrate; and KOH for potassium hydroxide. In addition, the water content originally contained in diethylene glycol which was used in this Example was less than 0.5% by weight, so that the water originally contained therein is not considered. In addition, in FIG. 9, the changes of the particle diameter (average value) of the nickel microparticle and of the coefficient of variation of the particle diameters (C. V.) relative to the ratio of water in the water-containing polyol used in Samples 18 to 24 for the first fluid are shown.

TABLE 5

| | First fluid: recipes and operation conditions | | | | | | |
|---|---|---|---|---|---|---|---|
| | Concentration (mol/L) | Concentration (% by weight) | | | Flow rate | Temperature | Ni production amount | Ratio of water in the water-containing polyol |
| Sample | NiSO₄·6H₂O | PEG600 | DEG | PW | (mL/minute) | (° C.) | (g/minute) | (% by weight) |
| 17 | 0.05 | 0.39 | 98.41 | 0.00 | — | — | — | 0.00 |
| 18 | 0.05 | 0.39 | 94.14 | 4.27 | 400 | 130 | 1.17 | 4.32 |
| 19 | 0.10 | 0.39 | 82.69 | 14.59 | 400 | 130 | 2.28 | 14.94 |
| 20 | 0.10 | 0.39 | 64.65 | 32.63 | 400 | 130 | 2.28 | 33.41 |
| 21 | 0.19 | 0.75 | 47.40 | 47.40 | 400 | 130 | 4.46 | 49.61 |
| 22 | 0.19 | 0.75 | 26.95 | 70.33 | 400 | 130 | 4.46 | 71.74 |
| 23 | 0.19 | 0.75 | 14.98 | 82.30 | 400 | 130 | 4.46 | 83.95 |
| 24 | 0.19 | 0.75 | 5.14 | 92.25 | 400 | 130 | 4.46 | 94.00 |

TABLE 6

| Sample | Second fluid: recipes and operation conditions | | | | | Particle diameter (nm) | C.V. (%) | Crystallite diameter (nm) |
| --- | --- | --- | --- | --- | --- | --- | --- | --- |
| | Concentration (% by weight) | | | Flow rate (mL/minute) | Temperature (° C.) | | | |
| | HMH | KOH | PW | | | | | |
| 17 | — | — | — | — | — | — | — | — |
| 18 | 25.00 | 20.00 | 55.00 | 150 | 40 | 93.6 | 5.01 | 24.9 |
| 19 | 25.00 | 20.00 | 55.00 | 150 | 40 | 101.2 | 3.45 | 25.2 |
| 20 | 25.00 | 20.00 | 55.00 | 150 | 40 | 125.6 | 2.56 | 25.6 |
| 21 | 20.00 | 30.00 | 50.00 | 150 | 40 | 157.8 | 2.42 | 27.8 |
| 22 | 20.00 | 30.00 | 50.00 | 150 | 40 | 187.6 | 6.87 | 28.1 |
| 23 | 20.00 | 30.00 | 50.00 | 150 | 40 | 257.9 | 8.84 | 28.4 |
| 24 | 20.00 | 30.00 | 50.00 | 150 | 40 | 389 | 11.23 | 29.1 |

From Samples 18 to 24, it was confirmed that by controlling the ratio of water in the water-containing polyol which is contained in the first fluid, the particle diameter of the nickel microparticle, the coefficient of variation thereof, and the diameter of the crystallite can be controlled. Specifically, it was confirmed that by raising the ratio of water in the water-containing polyol, the control can be done such that the particle diameter of the nickel microparticle and the diameter of the crystallite thereof may be made larger; and on the other hand, by lowering the ratio of water in the water-containing polyol, the control can be done such that the particle diameter of the nickel microparticle and the diameter of the crystallite thereof may be made smaller. In addition, it was confirmed that by controlling the ratio of water in the water-containing polyol so as to be in the range of 5 to 60% by weight, the coefficient of variation of the particle diameters of the nickel microparticles can be controlled in the range of less than 5%.

The solvent of the first fluid in Sample 17 comprises only the polyols; and therefore, as compared with the water-containing polyols which are the solvents of the first fluids in Samples 18 to 24, not only the saturated solubility of the nickel compound (nickel sulfate hexahydrate) is lower but also the precipitates were formed immediately after the first fluid was prepared at room temperature (25° C.); and thus, the nickel microparticles could not be obtained by using the first fluid of Sample 17. Therefore, it was judged that the first fluid of Sample 17 was not suitable as the fluid to produce the nickel microparticles.

In addition, when the ratio of water in the water-containing polyol which was contained in the first fluid was raised, it became possible to raise the concentration of nickel sulfate hexahydrate in the first fluid; and thus, by raising the ratio of water in the water-containing polyol, it became possible to increase the production amount of the nickel microparticles per unit time.

In Samples 18 to 24, the experiments were carried out with the same temperature of the first fluid and the second fluid; and it confirmed that by controlling the ratio of water in the water-containing polyol which was contained in the first fluid, the particle diameter of the nickel microparticles as well as the coefficient of variation thereof could be controlled, and that by controlling the ratio of water in the water-containing polyol so as to be in the range of 5 to 60% by weight, the coefficient of variation of the particle diameters of the nickel microparticles could be controlled in the range of less than 5%.

By using the fluid processing apparatus shown in FIG. 1, the fluid containing silver compound and the fluid containing reducing agent as samples 25 to 31 are mixed in the thin film fluid formed between the processing surfaces 1 and 2 which are disposed in a position they are faced with each other so as to be able to approach to and separate from each other, at least one of which rotates relative to the other, whereby the silver microparticle is prepared as the metal microparticle in this thin film fluid.

While supplying, as the first fluid, the nickel compound fluid from the center with the supply pressure of 0.30 MPaG and the rotation number of 1700 rpm, the fluid which contained the reducing agent was introduced as the second fluid into between the processing surfaces 1 and 2, whereby the first fluid and the second fluid were mixed in the thin film fluid. The disperse solution of the nickel microparticles was discharged from between the processing surfaces 1 and 2. This discharged disperse solution of the nickel microparticles was put on a magnet to settle the nickel microparticles; and after the supernatant solution thereof was removed, the washing operation by using pure water was repeated for 3 times. The obtained wet cake was dried under an atmospheric pressure at 25° C. to obtain the dry powder of the nickel microparticles. As a result of the XRD measurement of the powders obtained after drying the nickel microparticle, it was found that this has the crystal structure which agreed with the Ni of the FCC type; and in addition, by the ICP measurement of the solution which was obtained by dissolving this powders into nitric acid $HNO_3$, it was found that the nickel microparticles without containing impurities was produced. In addition, the particle diameters of the nickel microparticles were confirmed by the SEM observation; and the average value of the particle diameters thereof and the coefficient of variation of the particle diameters were calculated. In addition, the diameter of the crystallite thereof was calculated by the X-ray diffraction (XRD) measurement.

In Table 7 and Table 8, the process conditions (recipes and operation conditions) of the first fluid and the second fluid are shown. In addition, in Table 7, the production amount of the nickel microparticle per the unit time (Ni production amount) and the ratio of water in the water-containing polyol used in the first fluid are shown; and in Table 8, the average value of the particle diameters of the obtained nickel microparticles (this is shown in Table 8 as "particle diameter), the coefficient of variation (C. V.) of the particle diameters thereof, and the diameter of the crystallite are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; $NiSO_4 \cdot 6H_2O$ for nickel sulfate hexahydrate; PG for propylene glycol; PEG 600 for polyethylene glycol 600; PW for pure water; HMH for hydrazine monohydrate; and KOH for potassium hydroxide. In addition, the water content originally contained in propylene glycol which was used in this Example was less than 1.0% by weight, so that the water originally contained therein is not considered. In addition, in FIG. 10, the changes of the particle diameter (average value) of the nickel microparticle and of the coefficient of variation of the particle diameters (C. V.) relative to the ratio of water in the water-containing polyol used in Samples 25 to 30 for the first fluid are shown.

of water in the water-containing polyol, it became possible to increase the production amount of the nickel microparticles per unit time.

In addition, it was confirmed that by raising the ratio of water in the water-containing polyol which is contained in the first fluid, it becomes possible to carry out the reducing reaction under a low temperature in the first fluid; and as a result, the reaction temperature to separate the nickel microparticles can be lowered, so that the nickel microparticles can be produced with a lower cost and a lower energy as compared with conventional producing methods.

On the other hand, in Sample 25, there were no precipitates deposited after preparation of the first fluid; however,

TABLE 7

| | | First fluid: recipes and operation conditions | | | | | |
|---|---|---|---|---|---|---|---|
| | Concentration (mol/L) | Concentration (% by weight) | | | Flow rate | Temperature | Ni production amount | Ratio of water in the water-containing polyol |
| Sample | $NiSO_4 \cdot 6H_2O$ | PEG600 | PG | PW | (mL/minute) | (° C.) | (g/minute) | (% by weight) |
| 25 | 0.20 | 0.83 | 94.26 | 0.00 | 400 | 132 | 4.70 | 0.00 |
| 26 | 0.20 | 0.83 | 88.60 | 5.66 | 400 | 132 | 4.70 | 5.95 |
| 27 | 0.40 | 1.64 | 74.59 | 14.21 | 400 | 130 | 9.39 | 15.71 |
| 28 | 0.40 | 1.64 | 48.84 | 39.96 | 400 | 126 | 9.39 | 44.18 |
| 29 | 0.93 | 3.80 | 27.79 | 47.62 | 400 | 122 | 21.76 | 60.12 |
| 30 | 1.18 | 4.39 | 10.23 | 59.76 | 400 | 119 | 27.70 | 80.34 |
| 31 | 1.18 | 4.39 | 0.00 | 69.99 | 400 | 119 | — | 94.10 |

TABLE 8

| | Second fluid: recipes and operation conditions | | | | | Particle | | Crystallite |
|---|---|---|---|---|---|---|---|---|
| | Concentration (% by weight) | | | Flow rate | Temperature | diameter | C.V. | diameter |
| Sample | HMH | KOH | PW | (mL/minute) | (° C.) | (nm) | (%) | (nm) |
| 25 | 70 | 10 | 20 | 30 | 56 | 65.4 | 10.68 | 18.2 |
| 26 | 70 | 10 | 20 | 30 | 56 | 71.2 | 3.59 | 19.5 |
| 27 | 70 | 20 | 10 | 100 | 45 | 83.1 | 3.31 | 20.1 |
| 28 | 70 | 20 | 10 | 100 | 40 | 115.6 | 2.24 | 26.9 |
| 29 | 70 | 20 | 10 | 150 | 25 | 131.2 | 2.36 | 27.3 |
| 30 | 70 | 20 | 10 | 150 | 24 | 157.6 | 7.98 | 31.3 |
| 31 | 70 | 20 | 10 | 150 | 24 | — | — | — |

From Samples 25 to 30, it was confirmed that by controlling the ratio of water in the water-containing polyol which is contained in the first fluid, the particle diameter of the nickel microparticle, the coefficient of variation thereof, and the diameter of the crystallite can be controlled. Specifically, it was confirmed that by raising the ratio of water in the water-containing polyol, the control can be done such that the particle diameter of the nickel microparticle and the diameter of the crystallite thereof may be made larger; and on the other hand, by lowering the ratio of water in the water-containing polyol, the control can be done such that the particle diameter of the nickel microparticle and the diameter of the crystallite thereof may be made smaller. In addition, it was confirmed that by controlling the ratio of water in the water-containing polyol so as to be in the range of 5 to 60% by weight, the coefficient of variation of the particle diameters of the nickel microparticles can be controlled in the range of less than 5%.

In addition, when the ratio of water in the water-containing polyol which was contained in the first fluid was raised, it became possible to raise the concentration of nickel sulfate hexahydrate in the first fluid; and thus, by raising the ratio the time required for preparation of the first fluid was 5 hours. In addition, it was confirmed that if the long time of 9 hours or longer was used for dissolution, nickel sulfate hexahydrate could be dissolved into propylene glycol until the dissolved concentration thereof became about 20% by weight; and therefore, this was judged to be impractical. In addition, in Sample 31, production of the nickel microparticles was attempted without using propylene glycol at all; and in this case, the reduction could not be achieved sufficiently, so that it was impossible to produce the nickel microparticles.

By using the fluid processing apparatus shown in FIG. 1, the fluid containing silver compound and the fluid containing reducing agent as samples 32 to 39 are mixed in the thin film fluid formed between the processing surfaces 1 and 2 which are disposed in a position they are faced with each other so as to be able to approach to and separate from each other, at least one of which rotates relative to the other, whereby the silver microparticle is prepared as the metal microparticle in this thin film fluid.

While supplying, as the first fluid, the fluid which contained the reducing agent from the center with the supply pressure of 0.30 MPaG and the rotation number of 1700 rpm, the fluid which contained the nickel compound was introduced as the second fluid into between the processing surfaces 1 and 2, whereby the first fluid and the second fluid were mixed in the thin film fluid. The disperse solution of the nickel microparticles was discharged from between the processing surfaces 1 and 2. This discharged disperse solution of the nickel microparticles was put on a magnet to settle the nickel microparticles; and after the supernatant solution thereof was removed, the washing operation by using pure water was repeated for 3 times. The obtained wet cake was dried under an atmospheric pressure at 25° C. to obtain the dry powder of the nickel microparticles. As a result of the XRD measurement of the powders obtained after drying the nickel microparticle, it was found that this has the crystal structure which agreed with the Ni of the FCC type; and in addition, by the ICP measurement of the solution which was obtained by dissolving this powders into nitric acid $HNO_3$, it was found that the nickel microparticles without containing impurities was produced. In addition, the particle diameters of the nickel microparticles were confirmed by the SEM observation; and the average value of the particle diameters thereof and the coefficient of variation of the particle diameters were calculated. In addition, the diameter of the crystallite thereof was calculated by the X-ray diffraction (XRD) measurement.

In Table 9 and Table 10, the process conditions (recipes and operation conditions) of the first fluid and the second fluid are shown. In addition, in Table 9, the ratio of water in the water-containing polyol used in the first fluid; and in Table 10, the production amount of the nickel microparticle per the unit time (Ni production amount), the average value of the particle diameters of the obtained nickel microparticles (this is shown in Table 10 as "particle diameter), the coefficient of variation (C. V.) of the particle diameters thereof, the diameter of the crystallite, and the ratio of water in the water-containing polyol used in the second fluid are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; $NiSO_4.6H_2O$ for nickel sulfate hexahydrate; EG for ethylene glycol; PEG 600 for polyethylene glycol 600; PW for pure water; HMH for hydrazine monohydrate; and KOH for potassium hydroxide. In addition, the water content originally contained in ethylene glycol which was used in this Example was less than 1.0% by weight, so that the water originally contained therein is not considered. In addition, in FIG. 11, the changes of the particle diameter (average value) of the nickel microparticle, of the coefficient of variation of the particle diameters (C. V.) relative to the ratio of water in the water-containing polyol used in Samples 32 to 36 for the first fluid; and in FIG. 12, the particle diameter of the coefficient of variation of the particle diameters (C. V.) relative to the ratio of water in the water-containing polyol used in Samples 37, 38, 35 and 39 for the second fluid are shown.

TABLE 9

| | First fluid: recipes and operation conditions | | | | | | Ratio of water in the |
|---|---|---|---|---|---|---|---|
| | Concentration (% by weight) | | | | Flow rate | Temperature | water-containing polyol |
| Sample | HMH | KOH | EG | PW | (mL/minute) | (° C.) | (% by weight) |
| 32 | 2.65 | 2.12 | 95.23 | 0.00 | 600 | 132 | 0.00 |
| 33 | 2.65 | 2.12 | 87.49 | 7.74 | 600 | 130 | 8.13 |
| 34 | 2.65 | 2.12 | 80.63 | 14.60 | 600 | 130 | 15.33 |
| 35 | 2.50 | 2.00 | 55.00 | 40.50 | 600 | 129 | 42.41 |
| 36 | 2.50 | 2.00 | 25.00 | 70.50 | 600 | 129 | 73.82 |
| 37 | 2.50 | 2.00 | 55.00 | 40.50 | 600 | 128 | 42.41 |
| 38 | 2.50 | 2.00 | 55.00 | 40.50 | 600 | 128 | 42.41 |
| 39 | 2.50 | 2.00 | 55.00 | 40.50 | 600 | 128 | 42.41 |

TABLE 10

| | Second fluid: recipes and operation conditions | | | | | | | | | Ni | Ratio of water in the |
|---|---|---|---|---|---|---|---|---|---|---|---|
| | Concentration (mol/L) | Concentration (% by weight) | | | Flow rate | Temperature | Particle diameter | C.V. | Crystallite diameter | production amount | water-containing polyol |
| Sample | $NiSO_4 \cdot 6H_2O$ | PEG600 | EG | PW | (mL/minute) | (° C.) | (nm) | (%) | (nm) | (g/minute) | (% by weight) |
| 32 | 0.18 | 0.75 | 47.40 | 47.40 | 100 | 35 | 92.1 | 7.54 | 16.3 | 1.07 | 49.61 |
| 33 | 0.18 | 0.75 | 47.40 | 47.40 | 100 | 35 | 109.7 | 3.24 | 17.4 | 1.07 | 49.61 |
| 34 | 0.18 | 0.75 | 47.40 | 47.40 | 100 | 35 | 132.6 | 2.38 | 18.8 | 1.07 | 49.61 |
| 35 | 0.18 | 0.75 | 47.40 | 47.40 | 100 | 35 | 145.6 | 2.12 | 28.6 | 1.07 | 49.61 |
| 36 | 0.18 | 0.75 | 47.40 | 47.40 | 100 | 35 | 164.5 | 6.51 | 31.1 | 1.07 | 49.61 |
| 37 | 0.18 | 0.75 | 94.80 | 0.00 | 100 | 35 | 105.7 | 3.21 | 24.5 | 1.07 | 0.00 |
| 38 | 0.18 | 0.75 | 80.58 | 14.22 | 100 | 35 | 123.4 | 2.74 | 25.6 | 1.07 | 14.88 |
| 39 | 0.18 | 0.75 | 34.84 | 59.96 | 100 | 35 | 158.9 | 4.59 | 31.1 | 1.07 | 62.75 |

From Samples 32 to 39, it was confirmed that by controlling the ratio of water in the water-containing polyol which is contained in the first fluid and the second fluid, the particle diameter, the coefficient of variation, and the diameter of the crystallite can be controlled. Specifically, from Examples 32 to 36, it was confirmed that by raising the ratio of water in the water-containing polyol contained in the first fluid, the control can be done such that the particle diameter of the nickel microparticle and the diameter of the crystallite thereof may be made larger; and on the other hand, by lowering the ratio of water in the water-containing polyol contained in the first fluid, the control can be done such that the particle diameter of the nickel microparticle and the diameter of the crystallite thereof may be made smaller. From Examples 37, 38, 35 and 39, it was confirmed that by raising the ratio of water in the water-containing polyol contained in the second fluid, the control can be done such that the particle diameter of the nickel microparticle and the diameter of the crystallite thereof may be made larger; and on the other hand, by lowering the ratio of water in the water-containing polyol contained in the second fluid, the control can be done such that the particle diameter of the nickel microparticle and the diameter of the crystallite thereof may be made smaller. In addition, from Examples 32 to 36, it was confirmed that by controlling the ratio of water in the water-containing polyol contained in the first fluid so as to be in the range of 5 to 60% by weight, the coefficient of variation of the particle diameters of the nickel microparticles can be controlled in the range of less than 5%. From Examples 37, 38, 35, and 39, it was confirmed that by controlling the ratio of water in the water-containing polyol contained in the second fluid so as to be in the range of 5 to 60% by weight, the coefficient of variation of the particle diameters of the nickel microparticles can be controlled in the range of less than 5%.

In addition, in samples 32 to 36, it was confirmed that by raising the ratio of water in the water-containing polyol which is contained in the first fluid, it becomes possible to carry out the reducing reaction under a low temperature in the first fluid; and as a result, the reaction temperature to separate the nickel microparticles can be lowered, so that the nickel microparticles can be produced with a lower cost and a lower energy as compared with conventional producing methods.

In addition, it was confirmed that by controlling the ratio of water in the water-containing polyol which is contained in any one of the both fluids which contain the water-containing polyol, the one containing at least one metal compound and the other containing at least one reducing agent, the particle diameter of the nickel microparticles as well as the coefficient of variation thereof can be controlled.

By using the fluid processing apparatus shown in FIG. 1, the fluid containing silver compound and the fluid containing reducing agent as samples 40 to 45 are mixed in the thin film fluid formed between the processing surfaces 1 and 2 which are disposed in a position they are faced with each other so as to be able to approach to and separate from each other, at least one of which rotates relative to the other, whereby the silver microparticle is prepared as the metal microparticle in this thin film fluid.

While supplying, as the first fluid, the fluid which contained the reducing agent from the center with the supply pressure of 0.30 MPaG and the rotation number of 1700 rpm, the fluid which contained the nickel compound was introduced as the second fluid into between the processing surfaces 1 and 2, whereby the first fluid and the second fluid were mixed in the thin film fluid. The disperse solution of the nickel microparticles was discharged from between the processing surfaces 1 and 2. This discharged disperse solution of the nickel microparticles was put on a magnet to settle the nickel microparticles; and after the supernatant solution thereof was removed, the washing operation by using pure water was repeated for 3 times. The obtained wet cake was dried under an atmospheric pressure at 25° C. to obtain the dry powder of the nickel microparticles. As a result of the XRD measurement of the powders obtained after drying the nickel microparticle, it was found that this has the crystal structure which agreed with the Ni of the FCC type; and in addition, by the ICP measurement of the solution which was obtained by dissolving this powders into nitric acid $HNO_3$, it was found that the nickel microparticles without containing impurities was produced. In addition, the particle diameters of the nickel microparticles were confirmed by the SEM observation; and the average value of the particle diameters thereof and the coefficient of variation of the particle diameters were calculated. In addition, the diameter of the crystallite thereof was calculated by the X-ray diffraction (XRD) measurement.

In Table 11 and Table 12, the process conditions (recipes and operation conditions) of the first fluid and the second fluid are shown. In addition, in Table 11, the ratio of water in the water-containing polyol used in the first fluid; and in Table 12, the average value of the particle diameters of the obtained nickel microparticles (this is shown in Table 12 as "particle diameter), the coefficient of variation (C. V.) of the particle diameters thereof, the diameter of the crystallite, and the production amount of the nickel microparticle per the unit time (Ni production amount) are shown. The temperatures of the first fluid and the second fluid are the measured temperatures of each of the first fluid and the second fluid just before they are introduced into the processing apparatus (more precisely, just before they are introduced into between the processing surfaces 1 and 2); the temperatures thereof being controlled by heating and cooling.

Here, the abbreviations used in Tables are as follows; $Ni(NO_3)_2.6H_2O$ for nickel nitrate hexahydrate; EG for ethylene glycol; BYK-154 for DISPERBYK-154 (Dispersant produced by Altana AG); PW for pure water; HMH for hydrazine monohydrate; and KOH for potassium hydroxide. In addition, the water content originally contained in diethylene glycol which was used in this Example was less than 1.0% by weight, so that the water originally contained therein is not considered. In addition, in FIG. 13, the changes of the particle diameter (average value) of the nickel microparticle, of the coefficient of variation of the particle diameters (C. V.) relative to the ratio of water in the water-containing polyol used in Samples 40 to 45 for the first fluid are shown.

TABLE 11

| | First fluid: recipes and operation conditions | | | | | | | Ratio of water in the water-containing polyol |
|---|---|---|---|---|---|---|---|---|
| | Concentration (% by weight) | | | | | Flow rate | Temperature | |
| Sample | HMH | KOH | BYK-154 | EG | PW | (mL/minute) | (° C.) | (% by weight) |
| 40 | 1.00 | 0.15 | 0.13 | 97.85 | 0.00 | 400 | 131 | 0.00 |
| 41 | 1.00 | 0.15 | 0.13 | 93.15 | 4.70 | 400 | 130 | 4.80 |
| 42 | 1.00 | 0.15 | 0.13 | 64.57 | 33.28 | 400 | 125 | 34.01 |

TABLE 11-continued

| | First fluid: recipes and operation conditions | | | | | | Ratio of water in the water-containing polyol |
|---|---|---|---|---|---|---|---|
| | Concentration (% by weight) | | | | | Flow rate | Temperature | |
| Sample | HMH | KOH | BYK-154 | EG | PW | (mL/minute) | (° C.) | (% by weight) |
| 43 | 1.00 | 0.15 | 0.13 | 31.15 | 66.70 | 400 | 122 | 68.17 |
| 44 | 1.00 | 0.15 | 0.13 | 13.15 | 84.70 | 400 | 122 | 86.56 |
| 45 | 1.00 | 0.15 | 0.13 | 5.41 | 92.44 | 400 | 122 | 94.47 |

TABLE 12

| | Second fluid: recipes and operation conditions | | | | | | | |
|---|---|---|---|---|---|---|---|---|
| Sample | Concentration (mol/L) Ni(NO$_3$)$_2$·6H$_2$O | Concentration (% by weight) PW | Flow rate (mL/minute) | Temperature (° C.) | Particle diameter (nm) | C.V. (%) | Crystallite diameter (nm) | Ni production amount (g/minute) |
| 40 | 1.00 | 70.9 | 10 | 20 | 101.1 | 11.12 | 12.3 | 2.91 |
| 41 | 1.00 | 70.9 | 10 | 20 | 123.4 | 5.41 | 13.4 | 2.91 |
| 42 | 1.00 | 70.9 | 10 | 20 | 154.1 | 2.45 | 13.8 | 2.91 |
| 43 | 1.00 | 70.9 | 10 | 20 | 167.1 | 5.45 | 14.9 | 2.91 |
| 44 | 1.00 | 70.9 | 10 | 20 | 171.2 | 7.89 | 16.7 | 2.91 |
| 45 | 1.00 | 70.9 | 10 | 20 | 204.3 | 9.87 | 17.8 | 2.91 |

From Samples 40 to 45, it was confirmed that by controlling the ratio of water in the water-containing polyol which is contained in the first fluid, the particle diameter of the nickel microparticle, the coefficient of variation thereof, and the diameter of the crystallite can be controlled. Specifically, it was confirmed that by raising the ratio of water in the water-containing polyol, the control can be done such that the particle diameter of the nickel microparticle and the diameter of the crystallite thereof may be made larger; and on the other hand, by lowering the ratio of water in the water-containing polyol, the control can be done such that the particle diameter of the nickel microparticle and the diameter of the crystallite thereof may be made smaller. In addition, it was confirmed that by controlling the ratio of water in the water-containing polyol so as to be in the range of 5 to 60% by weight, the coefficient of variation of the particle diameters of the nickel microparticles can be controlled in the range of less than 5%.

In addition, it was confirmed that by raising the ratio of water in the water-containing polyol which is contained in the first fluid, it becomes possible to carry out the reducing reaction under a low temperature in the first fluid; and as a result, the reaction temperature to separate the nickel microparticles can be lowered, so that the nickel microparticles can be produced with a lower cost and a lower energy as compared with conventional producing methods.

1 first processing surface
2 second processing surface
10 first processing member
11 first holder
20 second processing member
21 second holder
d1 first introduction part
d2 second introduction part
d20 opening

The invention claimed is:
1. A method for producing metal microparticles wherein the method uses at least two fluids to be processed,
of them, at least one fluid to be processed is a fluid which contains at least one metal and/or metal compound, and at least one fluid to be processed other than the afore-mentioned fluid to be processed is a fluid which contains at least one reducing agent, wherein
these fluids to be processed are mixed to form a thin film fluid between at least two processing surfaces which are disposed in a position they are faced with each other so as to be able to approach to and separate from each other, at least one of which rotates relative to the other, whereby separating the metal microparticles, wherein
of the fluid which contains at least one metal and/or metal compound and the fluid which contains at least one reducing agent, at least any one fluid to be processed contains a water-containing polyol in which water and a polyol are mixed while not containing a monovalent alcohol, wherein
by controlling an amount of water which is contained in the water-containing polyol, particle diameter of the metal microparticles to be separated and coefficient of variation thereof are controlled,
wherein the polyol is (i) optionally ethylene glycol and (ii) at least one selected from the group consisting of propylene glycol, trimethylene glycol, tetraethylene glycol, polyethylene glycol, diethylene glycol, glycerin, and polypropylene glycol,
wherein, by controlling the amount of water which is contained in the water-containing polyol so as to be in the range of 5% to 60% by weight, the coefficient of variation is controlled in the range of less than 5%.
2. The method for producing metal microparticles according to claim 1, wherein
only one of the fluid which contains at least one metal and/or metal compound and the fluid which contains at least one reducing agent contains the water-containing polyol while not containing the monovalent alcohol.
3. The method for producing metal microparticles according to claim 2, wherein
the fluid which contains at least one metal and/or metal compound contains the water-containing polyol while not containing a monovalent alcohol.
4. The method for producing metal microparticles according to claim 3, wherein of the fluid which contains at least one metal and/or metal compound and the fluid which contains at least one reducing agent, any one fluid to be processed goes through between the two processing surfaces while forming the thin film fluid, a separate introduction path independent of a flow path through which the any one fluid to be processed passes is arranged, at least one opening leading to the separate introduction path is arranged in at least any one of the at least two processing surfaces, and of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

5. The method for producing metal microparticles according to claim 2, wherein of the fluid which contains at least one metal and/or metal compound and the fluid which contains at least one reducing agent, any one fluid to be processed goes through between the two processing surfaces while forming the thin film fluid, a separate introduction path independent of a flow path through which the any one fluid to be processed passes is arranged, at least one opening leading to the separate introduction path is arranged in at least any one of the at least two processing surfaces, and of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

6. The method for producing metal microparticles according to claim 1, wherein both the fluids to be processed, the fluid which contains at least one metal and/or metal compound and the fluid which contains at least one reducing agent, contain the water-containing polyol while not containing a monovalent alcohol.

7. The method for producing metal microparticles according to claim 6, wherein of the fluid which contains at least one metal and/or metal compound and the fluid which contains at least one reducing agent, any one fluid to be processed goes through between the two processing surfaces while forming the thin film fluid, a separate introduction path independent of a flow path through which the any one fluid to be processed passes is arranged, at least one opening leading to the separate introduction path is arranged in at least any one of the at least two processing surfaces, and of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

8. The method for producing metal microparticles according to claim 1, wherein of the fluid which contains at least one metal and/or metal compound and the fluid which contains at least one reducing agent, any one fluid to be processed goes through between the two processing surfaces while forming the thin film fluid, a separate introduction path independent of a flow path through which the any one fluid to be processed passes is arranged, at least one opening leading to the separate introduction path is arranged in at least any one of the at least two processing surfaces, and of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

9. The method for producing metal microparticles according to claim 1, wherein the metal and/or the metal compound is one selected from nickel, silver, a nickel compound, and a silver compound, and the reducing agent is a reducing agent to separate at least any one selected from nickel and silver.

10. The method for producing metal microparticles according to claim 1, wherein the at least one metal compound is a nickel compound, and the at least one reducing agent is a reducing agent to separate nickel, and average value of particle diameter of the nickel microparticles to be separated is 350 nm or less.

11. A method for producing metal microparticles wherein the method uses at least two fluids to be processed, of them, at least one fluid to be processed is a fluid which contains at least one metal and/or metal compound, and at least one fluid to be processed other than the afore-mentioned fluid to be processed is a fluid which contains at least one reducing agent, wherein these fluids to be processed are mixed to form a thin film fluid between at least two processing surfaces which are disposed in a position they are faced with each other so as to be able to approach to and separate from each other, at least one of which rotates relative to the other, whereby separating the metal microparticles, wherein of the fluid which contains at least one metal and/or metal compound and the fluid which contains at least one reducing agent, at least any one fluid to be processed contains a water-containing polyol in which water and a polyol are mixed while not containing a monovalent alcohol, wherein by controlling an amount of water which is contained in the water-containing polyol, particle diameter of the metal microparticles to be separated and coefficient of variation thereof are controlled, by controlling the amount of water which is contained in the water-containing polyol so as to be in the range of 5% to 60% by weight, the coefficient of variation is controlled in the range of less than 5%.

12. The method for producing metal microparticles according to claim 11, wherein the polyol is one selected from the group consisting of ethylene glycol, propylene glycol, trimethylene glycol, tetraethylene glycol, polyethylene glycol, diethylene glycol, glycerin, and polypropylene glycol.

13. The method for producing metal microparticles according to claim 11, wherein
only one of the fluid which contains at least one metal and/or metal compound and the fluid which contains at least one reducing agent contains the water-containing polyol while not containing the monovalent alcohol.

14. The method for producing metal microparticles according to claim 13, wherein
the fluid which contains at least one metal and/or metal compound contains the water-containing polyol while not containing a monovalent alcohol.

15. The method for producing metal microparticles according to claim 11, wherein
both the fluids to be processed, the fluid which contains at least one metal and/or metal compound and the fluid which contains at least one reducing agent, contain the water-containing polyol while not containing a monovalent alcohol.

16. The method for producing metal microparticles according to claim 11, wherein
of the fluid which contains at least one metal and/or metal compound and the fluid which contains at least one reducing agent, any one fluid to be processed goes through between the two processing surfaces while forming the thin film fluid,
a separate introduction path independent of a flow path through which the any one fluid to be processed passes is arranged,
at least one opening leading to the separate introduction path is arranged in at least any one of the at least two processing surfaces, and
of the fluid which contains at least one metal and/or metal compound and the fluid which contains at least one reducing agent, any other fluid to be processed is introduced from the opening into between the at least two processing surfaces, whereby mixing the fluid which contains at least one metal and/or metal compound and the fluid which contains at least one reducing agent in the thin film fluid.

17. The method for producing metal microparticles according to claim 11, wherein
the metal and/or the metal compound is one selected from nickel, silver, a nickel compound, and a silver compound, and
the reducing agent is a reducing agent to separate at least any one selected from nickel and silver.

18. The method for producing metal microparticles according to claim 11, wherein
the at least one metal compound is a nickel compound, and
the at least one reducing agent is a reducing agent to separate nickel, and
average value of particle diameter of the nickel microparticles to be separated is 350 nm or less.

* * * * *